(12) United States Patent
Usukura et al.

(10) Patent No.: US 10,649,131 B2
(45) Date of Patent: May 12, 2020

(54) DISPLAY DEVICE AND HEAD-MOUNTED DISPLAY

(71) Applicant: SHARP KABUSHIKI KAISHA, Sakai, Osaka (JP)

(72) Inventors: Naru Usukura, Sakai (JP); Takafumi Shimatani, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/347,963

(22) PCT Filed: Nov. 6, 2017

(86) PCT No.: PCT/JP2017/039876
§ 371 (c)(1),
(2) Date: May 7, 2019

(87) PCT Pub. No.: WO2018/088342
PCT Pub. Date: May 17, 2018

(65) Prior Publication Data
US 2019/0285790 A1    Sep. 19, 2019

(30) Foreign Application Priority Data
Nov. 9, 2016    (JP) .................................. 2016-218789

(51) Int. Cl.
*F21V 8/00*    (2006.01)
*F21S 2/00*    (2016.01)
*G02B 27/02*    (2006.01)

(52) U.S. Cl.
CPC ................ *G02B 6/005* (2013.01); *F21S 2/00* (2013.01); *G02B 6/0053* (2013.01); *G02B 27/02* (2013.01)

(58) Field of Classification Search
CPC ...... G02B 6/005; G02B 27/02; G02B 6/0053; G02B 6/0055; F21S 2/00
See application file for complete search history.

(56) References Cited

U.S. PATENT DOCUMENTS

| 4,936,657 A * | 6/1990 | Tejima ..................... G02B 3/08 348/E5.141 |
| 2010/0253591 A1* | 10/2010 | Hwu ........................ G02B 3/08 345/1.3 |

(Continued)

FOREIGN PATENT DOCUMENTS

| JP | H10-228245 A | 8/1998 | |
| JP | 3632208 B2 * | 3/2005 | ........... G02B 6/0055 |

*Primary Examiner* — Andrew J Coughlin
*Assistant Examiner* — Glenn D Zimmerman
(74) *Attorney, Agent, or Firm* — ScienBiziP, P.C.

(57) ABSTRACT

A display device includes a display panel, a lighting device having a light emission surface, a center directive light refraction member imparting a refraction effect to light exiting through the light emission surface to be directed to a middle section of the display panel to generate a much light emission angle range where an emission light quantity is much and a less light emission angle range where the light emission quantity is less in a luminance angle distribution, and an asymmetric light refraction member configured to impart an asymmetric refraction effect to the emission light such that among emission light rays exiting the center directive light refraction member, light rays in the less light emission angle range is directed toward the less light emission angle range while a part of light rays in the much light emission angle range is directed toward the less light emission angle range.

11 Claims, 16 Drawing Sheets

(56) References Cited

U.S. PATENT DOCUMENTS

| | | | |
|---|---|---|---|
| 2013/0208185 A1* | 8/2013 | Ishihara | G09G 5/006 |
| | | | 348/552 |
| 2015/0312546 A1* | 10/2015 | Hasegawa | H04N 13/398 |
| | | | 348/59 |
| 2016/0209576 A1* | 7/2016 | Robinson | G02B 27/225 |

* cited by examiner

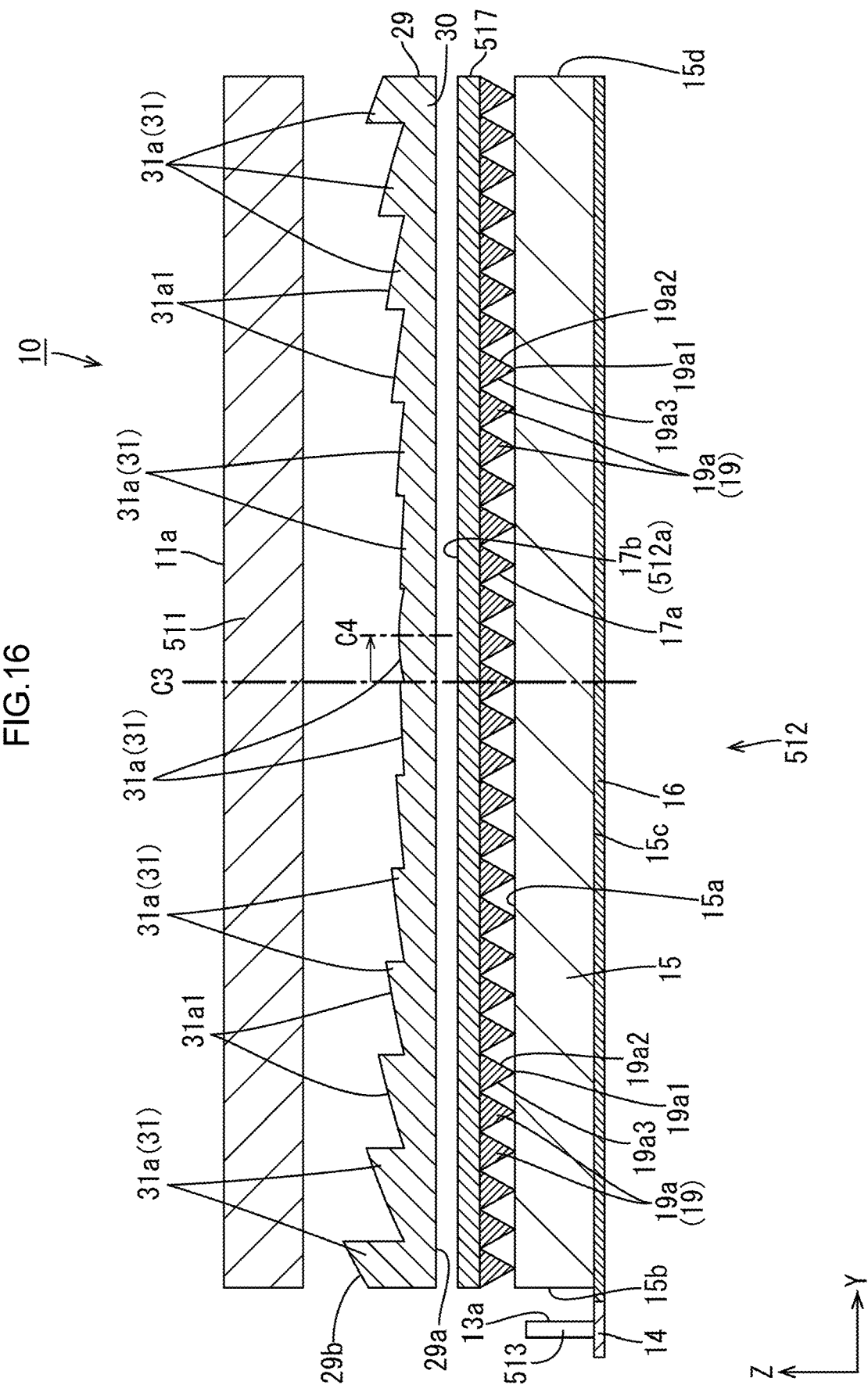

DISPLAY DEVICE AND HEAD-MOUNTED DISPLAY

TECHNICAL FIELD

The present invention relates to a display device and a head-mounted display.

BACKGROUND ART

Conventionally, an image display device disclosed in Patent Document 1 is known as one example of an image display device. The image display device disclosed in Patent Document 1 is provided with an image display element that displays an image, a light beam refraction unit formed in a flat plate shape arranged adjacent to an image display surface of the image display element so as to refract a main light beam in a light beam emitted by the image display element such that the main light beam is diffused outward, and an eyepiece optical system that guides the light beam passed through the light beam refraction unit to an eye ball of an observer and displays an enlarged image of the image displayed by the image display element.

RELATED ART DOCUMENT

Patent Document

Patent Document 1: Japanese Unexamined Patent Application Publication No. H10-228245

Problem to be Solved by the Invention

In the image display device disclosed in Patent Document 1 described above, in a case in which a liquid crystal panel is adopted as the image display device, a lighting device that emits light to the image display element for displaying an image on the image display element is needed. Here, in order to improve front luminance of the image displayed on the liquid crystal panel, it is necessary to improve the optical system of the lighting device; however, such an improvement tends to generate luminance unevenness easily in emission light from the lighting device. Thus, it has been difficult to achieve both of the improvement of the front luminance and the suppression of the luminance unevenness. In the image display device disclosed in Patent Document 1 described above, since the main light beam is refracted outward by the light beam refraction unit, the eyepiece optical system is made large, and as a result, the whole of the image display device is made large.

DISCLOSURE OF THE PRESENT INVENTION

The present invention is completed based on the problem described above, and an object of the present invention is to suppress luminance unevenness while improving front luminance.

Means for Solving the Problem

A display device of the present invention includes a display panel; a lighting device having a light emission surface through which light exits toward the display panel; a light source included in the lighting device; a center directive light refraction member included in the lighting device to face the display panel and configured to impart a refraction effect to at least light exiting through the light emission surface to be directed to a middle section of the display panel, so that a much light emission angle range in which an emission light quantity is relatively much and a less light emission angle range in which the emission light quantity is relatively less are generated in a luminance angle distribution indicating luminance of emission light at each angle with respect to the light emission surface; and an asymmetric light refraction member arranged to be overlapped with the display panel on a lighting device side or an opposite side from the lighting device side and configured to impart an asymmetric refraction effect to the emission light such that light rays in the less light emission angle range among emission light exiting the center directive light refraction member is directed toward the less light emission angle range, while at least a part of light rays in the much light emission angle range among the emission light exiting the center directive light refraction member is directed toward the less light emission angle range.

According to such a configuration, the image can be displayed on the display surface of the display panel by using the light emitted from the lighting device. When the light is emitted from the light source arranged on the lighting device, since the refraction effect is imparted to at least the light emitted from the light emission surface to be directed to the center side of the display panel, by the center directive light refraction member facing the display panel, utilization efficiency of the light is improved and front luminance of the display panel is improved. On the other hand, according to the refraction effect imparted to the emission light by the center directive light refraction member, the much light emission angle range in which the emission light quantity is relatively much and the less light emission angle range in which the emission light quantity is relatively less are included in the luminance angle distribution indicating luminance of the emission light at each angle against the light emission surface. Against this, since the asymmetric refraction effect is imparted to the emission light such that the light in the less light emission angle range among emission light of the center directive light refraction member is directed to the side of the less light emission angle range, while at least a part of the light in the much light emission angle range among the emission light of the center directive light refraction member is directed to the side of the less light emission angle range, by the asymmetric light refraction member arranged to be overlapped with the display panel at the side of the lighting device or at the opposite side opposite to the side of the lighting device, the emission light of the display device is made uniform in a surface of the light emission surface, and thereby luminance unevenness is hardly generated, and thereby display quality is improved. Further, since a light beam refraction unit that refracts a main light beam toward an outer side as in the conventional one is not provided, the display device is kept to be small.

The following configurations are preferable as embodiments of the present invention.

(1) The asymmetric light refraction member may be configured to impart an asymmetric refraction effect to emission light exiting the center directive light refraction member such that a center angle of a full width at half maximum of luminance in a luminance angle distribution indicating luminance of the emission light at each angle with respect to the light emission surface of the asymmetric light refraction member becomes close to 0 degrees. In a case in which the much light emission angle range and the less light emission angle range are included in the luminance angle distribution of the luminance of the emission light at each angle with respect to the light emission surface of the lighting device, the center angle of the full width at half maximum of the luminance of the emission light is shifted from 0 degrees. Against this, since the asymmetric refraction effect is imparted to the emission light of the center directive light refraction member by the asymmetric light refraction member, the center angle of the full width at half maximum of the luminance in the luminance angle distribution indicating the luminance of the emission light at each angle with respect to the light emission surface of the asymmetric light refraction member becomes close to 0 degrees. With this, the luminance unevenness is hardly generated.

(2) The lighting device may include a light guide plate formed in a plate shape having a light incident end surface on which light is incident and a light emission plate surface through which the light exits, the light incident end surface is one of outer peripheral end surfaces arranged to face the light source and the light emission plate surface is one of plate surfaces, and the center directive light refraction member may have a light incident surface facing the light emission plate surface of the light guide plate and has prisms aligned along a normal direction of the light incident end surface, and each of the prisms is arranged on the light incident surface to be extended along an orthogonal direction orthogonal to the normal direction of the light incident end surface and each of the prisms has an apex part and a pair of inclined surfaces interposing the apex part. With such a configuration, the prisms, each of which is extended along the orthogonal direction orthogonal to the normal direction of the light incident end surface of the light guide plate, aligned along the normal direction of the light incident end surface on the light incident surface of the center directive light refraction member, imparts the refraction effect to the light mainly on the inclined surface at an opposite side opposite to a side of the light source in the normal direction with respect to the apex part. In this way, by using the emission light of the center directive light refraction member to which the refraction effect is added in the normal direction of the light incident end surface, a narrow directivity (the luminance full width at half maximum is narrow) back light can be used. In a case in which light emission efficiency is the same, the front luminance of the narrow directivity backlight becomes high. However, although the front luminance of the display panel is improved, the angle range at a side of the light source in the normal direction of the light incident end surface is apt to be the less light emission angle range in the luminance angle distribution indicating the luminance of the emission light at each angle against the light emission surface of the lighting device, and thereby the luminance unevenness might be generated. With this respect, the asymmetric refraction effect is imparted to at least a part of the light in the much light emission angle range among the emission light of the center directive light refraction member, to be directed to the side of the less light emission angle range by the asymmetric light refraction member, and thereby the luminance unevenness as described above is hardly generated.

(3) The asymmetric light refraction member may be arranged to be overlapped with the display panel on the lighting device side. With such a configuration, since the emission light of the asymmetric light refraction member is emitted toward an outside after transmitting the display panel, the interference fringe or the like generated in the emission light of the asymmetric light refraction member is hardly seen, and thereby superior display quality can be obtained. In addition, since the asymmetric light refraction member is protected by the display panel, a foreign substance or the like is hardly stuck to the asymmetric light refraction member, and thereby optical performance of the asymmetric light refraction member can be favorably derived.

(4) The asymmetric light refraction member may be arranged to be overlapped with the display panel on an opposite side of the lighting device. With such a configuration, the asymmetric refraction effect is imparted to the emission light of the display panel by the asymmetric light refraction member, and thereby much more light travelling along the normal direction of the display panel is included in the light transmitting the display panel, compared to a configuration in which the asymmetric refraction effect is imparted to incident light on the display panel by the asymmetric light refraction member. Generally, the light travelling along the normal direction of the display panel most efficiently transmits the display panel and contrast thereof can be easily obtained. Accordingly, in a case in which much more light travelling along the normal direction of the display panel is included in the light transmitting the display panel as described above, the luminance when a gradation of the display panel is set to a maximum value is made high, and thereby the contrast can be made high.

(5) The center directive light refraction member may be configured to selectively impart the refraction effect to light in a first direction along the light emission surface, and the display device may further include a symmetric light refraction member arranged to be overlapped with the asymmetric light refraction member on the lighting device side or an opposite side from the lighting device side so as to impart a symmetric refraction effect to emission light of the center directive light refraction member in a second direction orthogonal to the first direction. With such a configuration, when the light is emitted from the light source, since the refraction effect is selectively imparted to the light in the first direction along the light emission surface of the lighting device by the center directive light refraction member, the utilization efficiency of the light in the first direction is improved and the front luminance of the display panel in the first direction is improved. On the other hand, since the symmetric light refraction member imparts the symmetric refraction effect to the emission light of the center directive light refraction member in the second direction orthogonal to the first direction, the utilization efficiency of the light in the second direction is also improved and the front luminance of the display panel in the second direction is also improved.

(6) The center directive light refraction member may be configured to selectively impart the refraction effect to light in a first direction along the light emission surface, the asymmetric light refraction member may have a base material and a curved surface lens arranged on a light emission surface of the base material, light exits through the light emission surface, and the curved surface lens has a surface formed in a curved shape and the curved surface lens may be formed such that a curvature of the surface in the much light emission angle range in the first direction is larger than a curvature of the surface in the less light emission angle range in the first direction. With such a configuration, when the light is emitted from the light source, the refraction effect is selectively imparted to the light in the first direction along the light emission surface of the lighting device, by the center directive light refraction member, and thereby the utilization efficiency of the light in the first direction is improved and the front luminance of the display panel is improved. On the other hand, the surface of the curved surface lens arranged on the light emission surface of the base material is formed in a curved shape, and thereby the asymmetric light refraction member imparts the refraction effect to the emission light of the center directive light refraction member. Since, in the asymmetric light refraction member, the curvature of the surface of the curved surface lens in the much light emission angle range in the first direction is larger than the curvature of the surface of the curved surface lens in the less light emission angle range in the first direction, a relatively large refraction effect is imparted to at least a part of the light in the much light emission angle range among the emission light of the center directive light refraction member by the surface of the curved surface lens, and therefore the light is directed to the side of the less light emission angle range. On the other hand, a relatively small refraction effect is imparted to the light in the less light emission angle range among the emission light of the center directive light refraction member by the surface of the curved surface lens, and thereby the light is directed to the side of the less light emission angle range. In this way, the asymmetric refraction effect is imparted to the light, and thereby the luminance unevenness is hardly generated.

(7) The asymmetric light refraction member may serve as a linear Fresnel lens in which the curved surface lens is extended linearly in a second direction orthogonal to the first direction and the curved surface lenses are aligned along the first direction, and the linear Fresnel lenses may be set such that a curvature of a surface of the linear Fresnel lens arranged on a much light emission angle range side with respect to the first direction is larger than a curvature of a surface of the linear Fresnel lens arranged on a less light emission angle range side. With such a configuration, a relatively large refraction effect is imparted to at least a part of the light in the much light emission angle range among the emission light of the center directive light refraction member by the surface of the linear Fresnel lens arranged at the side of the much light emission angle range in the first direction, and thereby the light is directed to the side of the less light emission angle range. On the other hand, a relatively small refraction effect is imparted to the light in the less light emission angle range among the emission light of the center directive light refraction member by the surface of the linear Fresnel lens arranged at the side of the less light emission angle range in the first direction, and thereby the light is directed to the side of the less light emission angle range. In this way, the asymmetric refraction effect is imparted to the light, and thereby the luminance unevenness is hardly generated.

(8) The asymmetric light refraction member may be arranged such that a center position with respect to the first direction is offset from a center position of the center directive light refraction member. Even in a case in which the luminance angle distribution indicating the luminance of the emission light at each angle against the light emission surface of the lighting device is deviated in the first direction due to, for example, a problem in producing, since the center position in the first direction of the asymmetric light refraction member is offset from the center position in the first direction of the center directive light refraction member, the positional deviation of the luminance angle distribution can be corrected by adjusting the offset amount. With this, the luminance unevenness is hardly generated.

(9) The center directive light refraction member may be configured to selectively impart the refraction effect to light with respect to a first direction along the light emission surface, the asymmetric light refraction member may have a base material and a curved surface lens arranged on a light emission surface of the base material, light exits through the light emission surface, and the curved surface lens has a surface formed in a curved shape having a uniform curvature, and the asymmetric light refraction member may be arranged such that a center position in the first direction is offset from a center position of the center directive light refraction member toward the much light emission angle range in the first direction. With such a configuration, when the light is emitted from the light source, since the refraction effect is selectively imparted to the light in the first direction along the light emission surface of the lighting device by the center directive light refraction member, the utilization efficiency of the light in the first direction is improved and the front luminance of the display panel in the first direction is improved. On the other hand, in the asymmetric light refraction member, a surface of the curved surface lens arranged on the light emission surface of the base material is formed in a curved shape having a uniform curvature, and thereby the asymmetric light refraction member imparts the refraction effect to the emission light of the center directive light refraction member. Since the center position in the first direction of the asymmetric light refraction member is offset toward the side of the much light emission angle range with respect to the center position in the first direction of the center directive light refraction member, at least a part of the curved surface lens arranged at the side of the less light emission angle range in the first direction with respect to the center position in the first direction of the asymmetric light refraction member is arranged at the side of the much light emission angle range. Accordingly, the refraction effect is imparted to at least a part of the light in the much light emission angle range among the emission light of the center directive light refraction member by the at least a part of the curved surface lens arranged at the side of the less light emission angle range in the first direction with respect to the center position in the first direction of the asymmetric light refraction member, and thereby the light is directed to the side of the less light emission angle range. On the other hand, the refraction effect is imparted to the light in the less light emission angle range among the emission light of the center directive light refraction member by the curved surface lens arranged at the side of the less light emission angle range in the first direction with respect to the center position in the first direction of the asymmetric light refraction member, and thereby the light is directed to the less light emission angle range. In this way, the asymmetric refraction effect is imparted to the light, and thereby the luminance unevenness is hardly generated.

In order to solve the problem described above, a head-mounted display according to the present invention at least includes the display device described above, a lens portion that images an image displayed on the display device, in an eye of a user, and a head-mounted instrument having the display device and the lens portion to be mounted to a head of the user. According to the head-mounted display having such a configuration, when a user uses the head-mounted display in a state in which the head-mounted instrument is mounted to the head, the image displayed on the display device is imaged in the eye of the user through the lens portion, and accordingly the user can view the enlarged image of the image displayed on the display device. Here, since the refraction effect is imparted to the light emitted from an end side of the light emission surface of the lighting device installed in the display device, by the center directive light refraction member so as to be directed to the center side of the display panel, the light can be delivered efficiently to the eye of the user that views the enlarged image of the image displayed on the display panel. With this, superior display quality can be obtained, and reduction of a production cost and improvement of productivity according the head-mounted display can be achieved.

Advantageous Effect of the Invention

According to the present invention, the generation of the luminance unevenness can be suppressed while improving the front luminance.

BRIEF DESCRIPTION OF THE DRAWINGS

FIG. 16 is a cross-sectional view taken along a long side direction of a liquid crystal display device according to a sixth embodiment of the present invention.

MODES FOR CARRYING OUT THE INVENTION

First Embodiment

A first embodiment of the present invention will be described with reference to FIG. 1 to FIG. 7. In the present embodiment, a goggle type head-mounted display (HMD: head-mounted display) HMD and a liquid crystal display device (display device) 10 used in the head-mounted display HMD are exemplarily described. In some of the drawings, an X axis, a Y axis and a Z axis are illustrated, so that the illustration in some of the drawings is shown in accordance with the respective axes.

Figure 1:
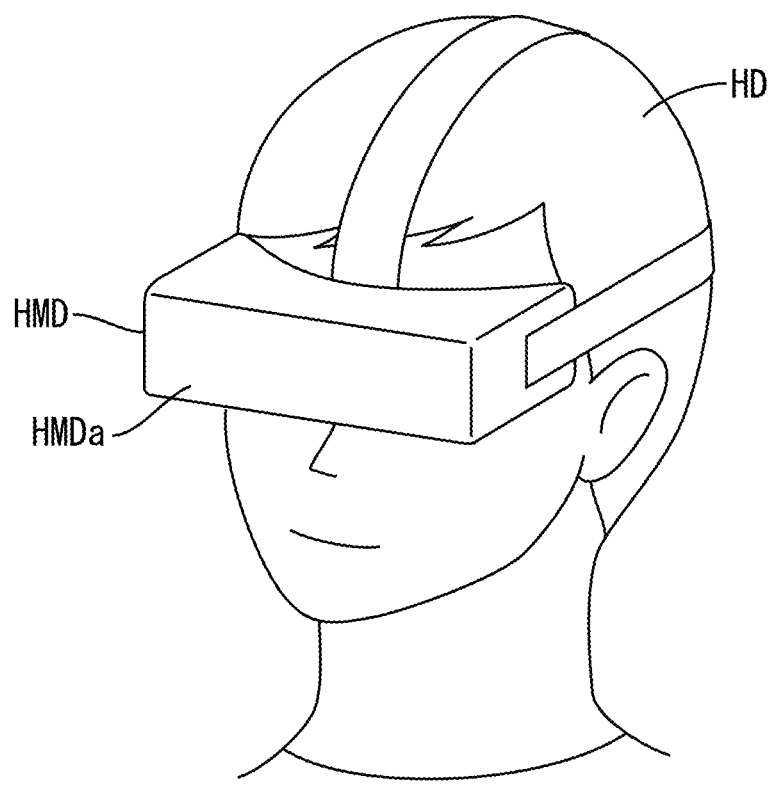
FIG. 1 is a schematic perspective view illustrating a head-mounted display mounted to a head of a user according to a first embodiment of the present invention.
Figure 2:
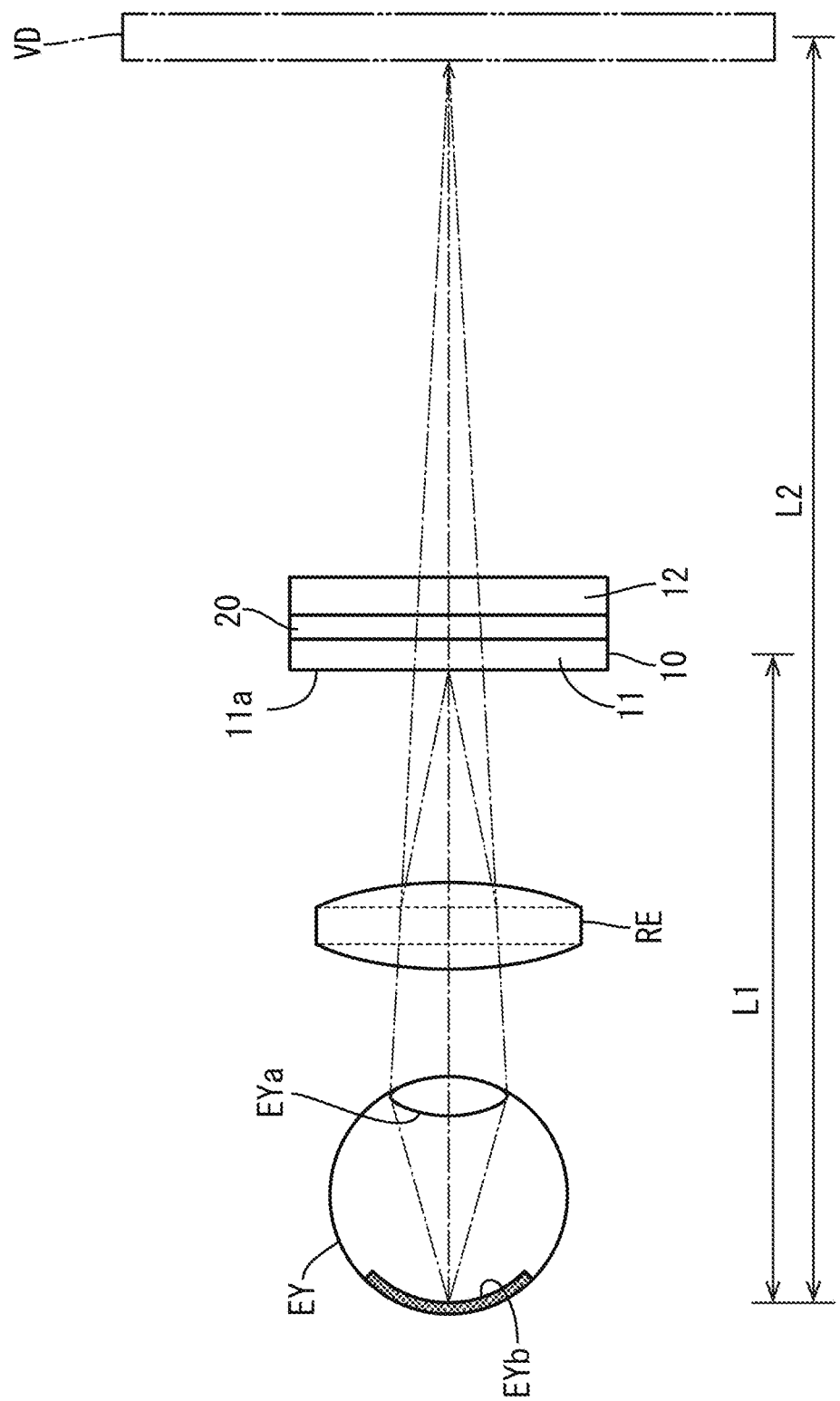
FIG. 2 is a schematic side view illustrating an optical relationship between a liquid crystal display device and a lens portion, which are installed in a head-mounted instrument that forms the head-mounted display, and an eye ball of a user.

As shown in FIG. 1, the goggle type head-mounted display HMD is provided with a head-mounted instrument HMDa mounted to a head HD so as to cover both eyes of a user. As shown in FIG. 2, the head-mounted instrument HMDa is provided with at least the liquid crystal display device 10 that displays an image, and a lens portion (eyepiece lens portion) RE that images the image, which is displayed on the liquid crystal display device 10, in an eye ball (eye) EY of a user. Although it is described in detail below, the liquid crystal display device 10 is provided with at least a liquid crystal panel (display panel) 11, and a backlight device (lighting device) 12 that emits light to the liquid crystal panel 11. The lens portion RE is arranged to be interposed between the liquid crystal display device 10 and the eye ball EY of a user so as to impart a refraction effect to the transmission light. By adjusting a focal distance of the lens portion RE, the user recognizes as if the image imaged on a retina (eye) EYb through a crystalline lens EYa of the eye ball EY is displayed on a virtual display VD virtually arranged at a position far from the eye ball EY by a distance L2 much longer than an actual distance L1 between the eye ball EY and the liquid crystal display device 10. With this, the user can view an enlarged image as a virtual image displayed on the virtual display VD having a display size (for example, several tens of inches to several hundreds of inches) much larger than a display size (for example, several one-tenth inches to several inches) of the liquid crystal display device 10. One liquid crystal display device 10 may be installed in the head-mounted instrument HMDa to display both of an image for a right eye and an image for a left eye on the liquid crystal display device 10, or alternatively two liquid crystal display devices 10 may be installed in the head-mounted instrument HMDa to display the image for the right eye on one liquid crystal display device 10 and the image for the left eye on another liquid crystal display device 10, respectively. Although an illustration is omitted, an earphone that emits a sound and is attached to an ear of the user, or the like is also installed in the head-mounted instrument HMDa.

The liquid crystal panel 11 and the backlight device 12 that form the liquid crystal display device 10 are sequentially described. As shown in FIG. 2, the liquid crystal panel 11 is formed in a rectangular plate shape as a whole, and a plate surface at a side of the lens portion RE is formed as a display surface 11a that displays an image. The liquid crystal panel 11 is provided with at least a pair of glass substrates stuck to form a predetermined gap the glass substrates, and a liquid crystal layer including liquid crystal molecules that are sealed between the substrates and are changed in an optical characteristic in accordance with applying of an electric field. In one glass substrate (array substrate, active matrix substrate), a switching element (for example, TFT) connected to a source line and a gate line, which are orthogonally intersected to each other, and a pixel electrode arranged in a rectangular region surrounded by the source line and the gate line so as to be connected to the switching element, are planarly arranged in a matrix manner, and also an directive film or the like is arranged. In another glass substrate (counter substrate, CF substrate), a color filter in which coloring portions for R (red), G (green), and B (blue) are planarly arranged in a matrix manner with a predetermined arrangement, and a light shielding layer (black matrix) arranged between the coloring portions in a lattice manner, a solid counter electrode arranged to face the pixel electrode, and an directive film or the like are arranged. Polarization plates are arranged at outer sides of both glass substrates, respectively.

Figure 3:
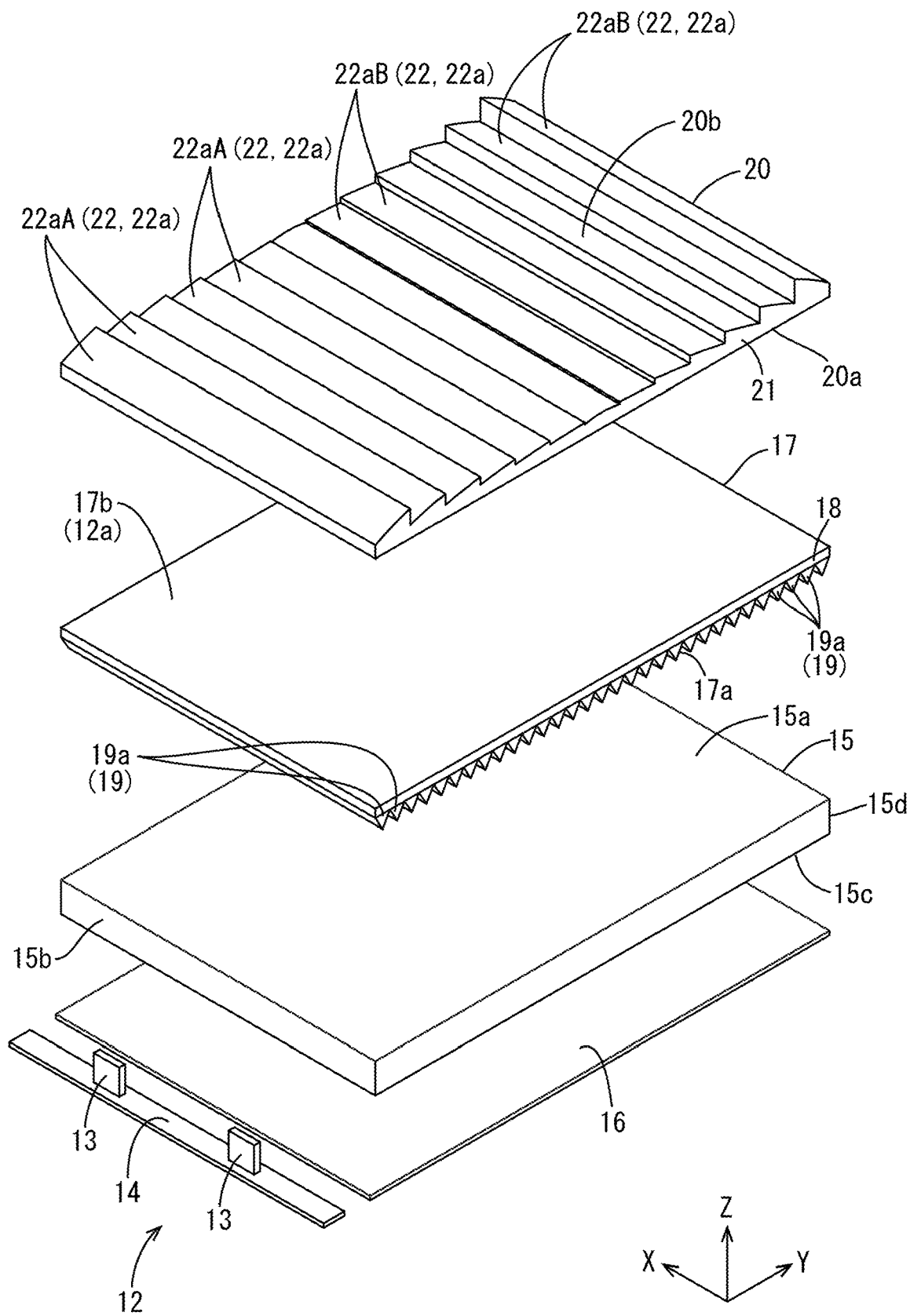
FIG. 3 is a perspective view illustrating a backlight device and an asymmetric linear Fresnel lens sheet that form the liquid crystal display device.

Next, the backlight device 12 is described. As shown in FIG. 3, the backlight device 12 is provided with at least an LED (light source) 13, an LED substrate (light source substrate) 14 on which the LED 13 is mounted, a light guide plate 15 that guides light from the LED 13, a reflection sheet (reflection member) 16 arrange to be laminated on the light guide plate 15 at a back side of the light guide plate 15, and a center directive prism sheet (center directive light refraction member) 17 serving as an optical sheet (optical member) laminated on the light guide plate 15 at a front side of the light guide plate 15 and arranged to be interposed between the light guide plate 15 and the liquid crystal panel 11. The backlight device 12 is formed as a one-sided light incident type device and an edge light type (side light type) device in which the light of the LED 13 is incident on the light guide plate 15 from one side thereof.

As shown in FIG. 3, the LED 13 is formed such that an LED chip is sealed on a substrate fixed to the LED substrate 14, by a sealing agent. The LED 13 is formed such that the LED chip emits single color light, for example, blue light, and a phosphor (a yellow phosphor, a green phosphor, a red phosphor and the like) is compounded and dispersed to the sealing agent, so that the LED 13 emits white light as a whole. The LED 13 is mounted on a surface of the LED substrate 14 and is formed as a so-called side surface light emission type LED in which a surface of the LED 13 adjacent to a mount surface to be mounted to the LED substrate 14 is formed as a light emission surface 13*a*. The LED substrate 14 is arranged such that a plate surface thereof is parallel to a plate surface of the light guide plate 15. A plate surface of the LED substrate 14 at a front side is formed as the mount surface for the LED 13. The LEDs 13 (two LEDs in FIG. 3) are mounted to the mount surface.

Figure 4:
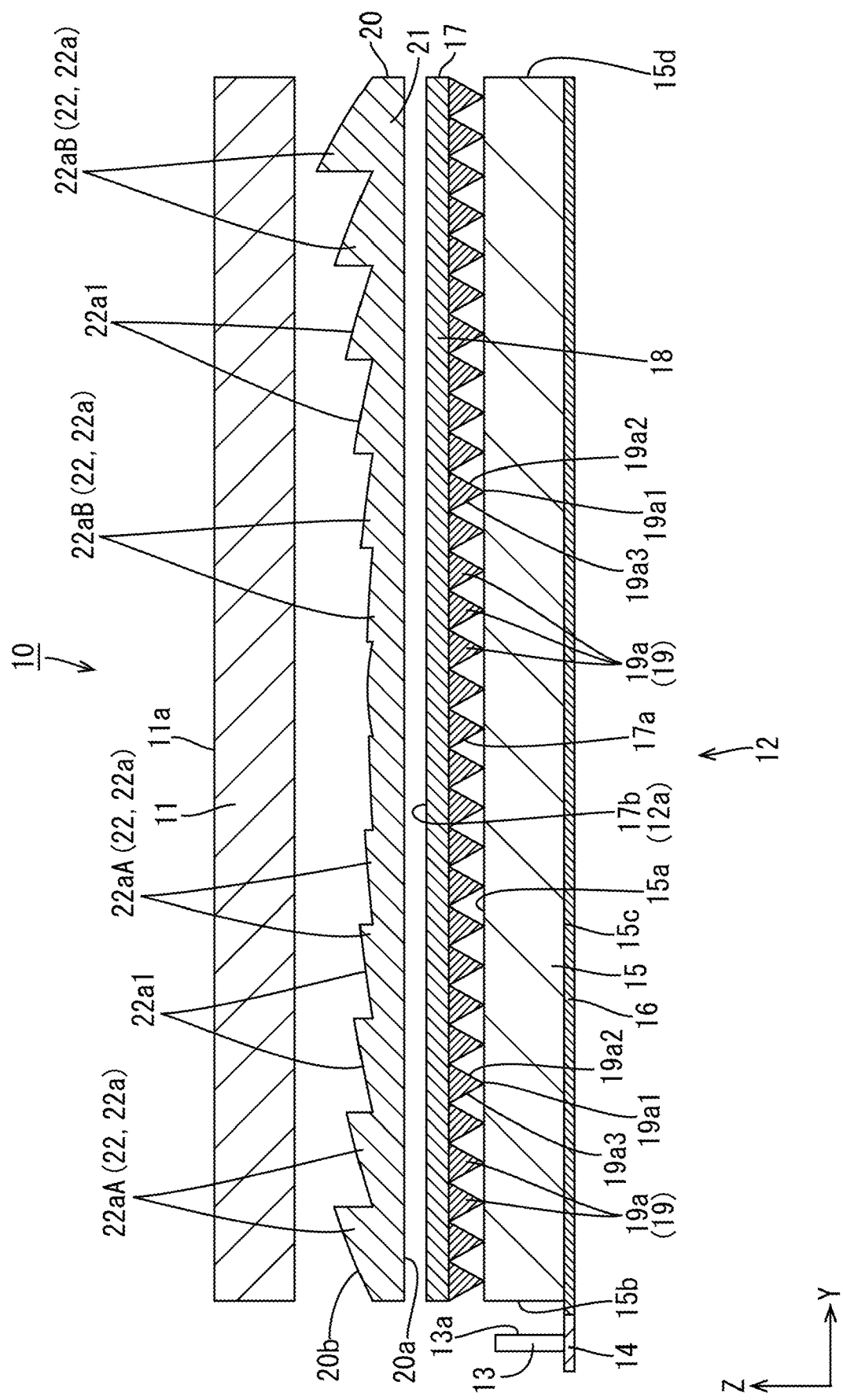
FIG. 4 is a cross-sectional view taken along a long side direction of the liquid crystal display device.
Figure 5:
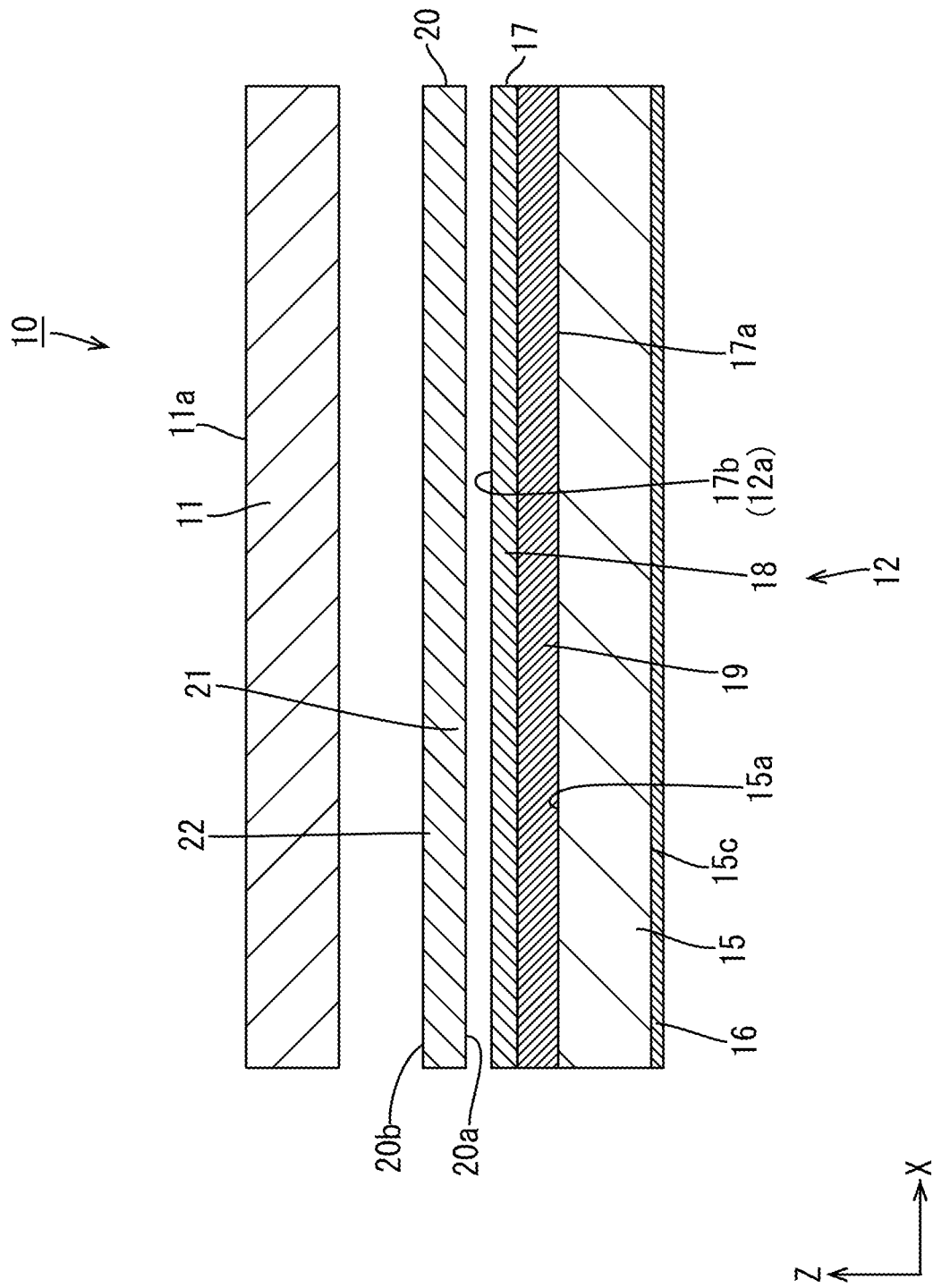
FIG. 5 is a cross-sectional view taken along a short side direction of the liquid crystal display device.

The light guide plate 15 is formed by a synthetic resin material (for example, an acryl resin such as PMMA) substantially transparent having a refractive index sufficiently higher than that of air. As shown in FIG. 3, the light guide plate 15 is formed in a flat plate shape. A plate surface of the light guide plate 15 is arranged to be parallel to a plate surface (display surface 11*a*) of the liquid crystal panel 11. In the light guide plate 15, a long side direction of the plate surface coincides with a Y axis direction in each drawing, a short side direction coincides with the X axis direction, and a plate thickness direction orthogonal to the plate surface coincides with a Z axis direction. The plate surface facing the liquid crystal panel 11 and the center directive prism sheet 17 among a pair of the plate surfaces of the light guide plate 15 serves as a light emission plate surface 15*a* that emits the light guided through an inside. As shown in FIG. 4 and FIG. 5, the light guide plate 15 is arranged right below the liquid crystal panel 11 and the center directive prism sheet 17, and an end surface at one short side among outer peripheral end surfaces of the light guide plate 15 is arranged to face the light emission surface 13*a* of the LED 13 and serves as a light incident end surface 15*b* on which the light from the light emission surface 13*a* is incident. Further, an end surface at another short side among the outer peripheral end surfaces of the light guide plate 15 serves as a light incident opposite end surface 15*d* arranged at a side opposite to the light incident end surface 15*b*. The light guide plate 15 guides the light emitted from the LED 13 toward the light guide plate 15 along the Y axis direction (an aligned direction of the LED 13 and the light guide plate 15) so as to be introduced from the light incident end surface 15*b* and to be propagated inside the light guide plate 15. After that, the light guide plate 15 emits the light from the light emission plate surface 15*a* such that the light is directed upward to a side of the center directive prism sheet 17 (a front side, a light emission side) along the Z axis direction (an aligned direction of the liquid crystal panel 11 and the center directive prism sheet 17, and the light guide plate 15). A normal direction (first direction) of the light incident end surface 15*b* serving as the aligned direction of the LED 13 and the light guide plate 15 coincides with the Y axis direction in each drawing, and a direction (second direction) along the light emission plate surface 15*a* and orthogonal to the normal direction of the light incident end surface 15*b* coincides with the X axis direction in each drawing.

As shown in FIG. 3 and FIG. 4, the reflection sheet 16 is arranged such that a plate surface thereof is parallel to each of the plate surfaces of the liquid crystal panel 11 and the light guide plate 15 so as to cover the light emission opposite plate surface 15*c* at the side opposite to the light emission plate surface 15*a* of the light guide plate 15. The reflection sheet 16 is superior in light reflection performance, and therefore the reflection sheet 16 can raise the light leaked from the light emission opposite plate surface 15*c* of the light guide plate 15, toward a front side (the light emission plate surface 15*a*), efficiently. The reflection sheet 16 is formed slightly larger than the light guide plate 15 in outer shape. The reflection sheet 16 is arranged such that an end portion at one long side is protruded to the side of the LED 13 with respect to the light incident end surface 15*b*.

As shown in FIG. 3, the center directive prism sheet 17 is formed in a sheet shape having a sheet thickness thinner than the plate thickness of the light guide plate 15, and a plate surface of the center directive prism sheet 17 is parallel to each of the plate surfaces of the liquid crystal panel 11 and the light guide plate 15. The center directive prism sheet 17 is arranged to be overlapped with a front side (light emission side) of the light emission plate surface 15*a* of the light guide plate 15 so as to impart a predetermined optical effect (an anisotropic light condensing effect) to emission light from the light emission plate surface 15*a*. The center directive prism sheet 17 is formed such that, among a pair of front and back plate surfaces, a plate surface at a back side facing the plate surface (light emission plate surface 15*a*) of the light guide plate 15 serves as a light incident surface 17*a* on which the light from the light guide plate 15 is incident, and a plate surface at a front side facing a plate surface (light incident surface 20*a*) of an asymmetric linear Fresnel lens sheet 20 described below serves as a light emission surface 17*b* from which the light is emitted toward the asymmetric linear Fresnel lens sheet 20. The light emission surface 17*b* of the center directive prism sheet 17 forms the light emission surface 12*a* of the backlight device 12.

Specifically, as shown in FIG. 4 and FIG. 5, the center directive prism sheet 17 is formed by a base material 18 formed of a substantially transparent synthetic resin, and a light condensing portion 19 arranged on a plate surface of the base material 18 at a back side, namely on the light incident surface 17*a*, so as to impart a light condensing effect to the incident light. The light condensing portion 19 is formed by prisms 19*a*, each of which is protruded toward the back side (the light incident side, a side of the light guide plate 15) along the Z axis direction from the light incident surface 17*a*. The prism 19*a* is formed in a substantially mountain shape in section taken along the Y axis direction (the normal direction of the light incident end surface 15*b*, the first direction) and is extended linearly in the X axis direction (a direction orthogonal to the normal direction of the light incident end surface 15*b*, the second direction). The prisms 19*a* are aligned along the Y axis direction on the light incident surface 17*a*. Each of the prisms 19*a* is formed in a substantially isosceles triangle in section, having a pair of inclined surfaces 19*a*2 and 19*a*3 interposing an apex part 19*a*1. Among a pair of the inclined surfaces 19*a*2 and 19*a*3, one inclined surface at a side of the LED 13 (a left side in FIG. 4) in the Y axis direction serves as an LED side inclined surface (light source side inclined surface) 19*a*3, and another inclined surface at an opposite side (a right side in FIG. 4) opposite to the side of the LED 13 in the Y axis direction serves as an LED opposite side inclined surface (light source opposite side inclined surface) 19*a*2.

As shown in FIG. 4, when the light is incident on the prism 19*a* having such a configuration from a side of the light guide plate 15, the light incident on the prism 19*a* is refracted at an interface between each of the inclined surfaces 19*a*2 and 19*a*3 and an air layer at an outside, so that the light is raised toward a front direction (the normal direction of the light emission surface 17*b*). More specifically, the backlight device 12 is formed as an one-sided light incident type device and an edge light type device, and therefore, in the light emitted from the light emission plate surface 15*a* of the light guide plate 15, the light directed to the opposite side (the side of the light incident opposite end surface 15*d*) opposite to the side of the LED 13 is more than the light directed to the side of the LED 13 (the side of the light incident end surface 15*b*) with respect to the front direction in the Y axis direction. Thus, a refraction effect is imparted to a lot of light in the light incident on the prism 19*a* of the center directive prism sheet 17 from the light emission plate surface 15*a* of the light guide plate 15, by the LED opposite side inclined surface 19*a*2 among the inclined surfaces 19*a*2 and 19*a*3 of the prism 19*a*. As a result, the light is emitted from the light emission surface 17*b* to be directed to the opposite side opposite to the side of the LED 13 with respect to the front direction in the Y axis direction. Such a light condensing effect is imparted to the light incident on the prism 19*a* along the Y axis direction, while the light condensing effect is hardly imparted to the light incident on the prism 19*a* along the X axis direction orthogonal to the Y axis direction. Accordingly, in the light condensing portion 19 according to the present embodiment, the Y axis direction, which is the aligned direction of the prisms 19*a*, serves as a light condensing direction in which the light condensing effect is imparted to the light, and the X axis direction, which is an extension direction of each of the prisms 19*a*, serves as a non-light condensing direction in which the light condensing effect is hardly imparted to the light, so that the light condensing portion 19 has an anisotropic light condensing function.

Figure 6:
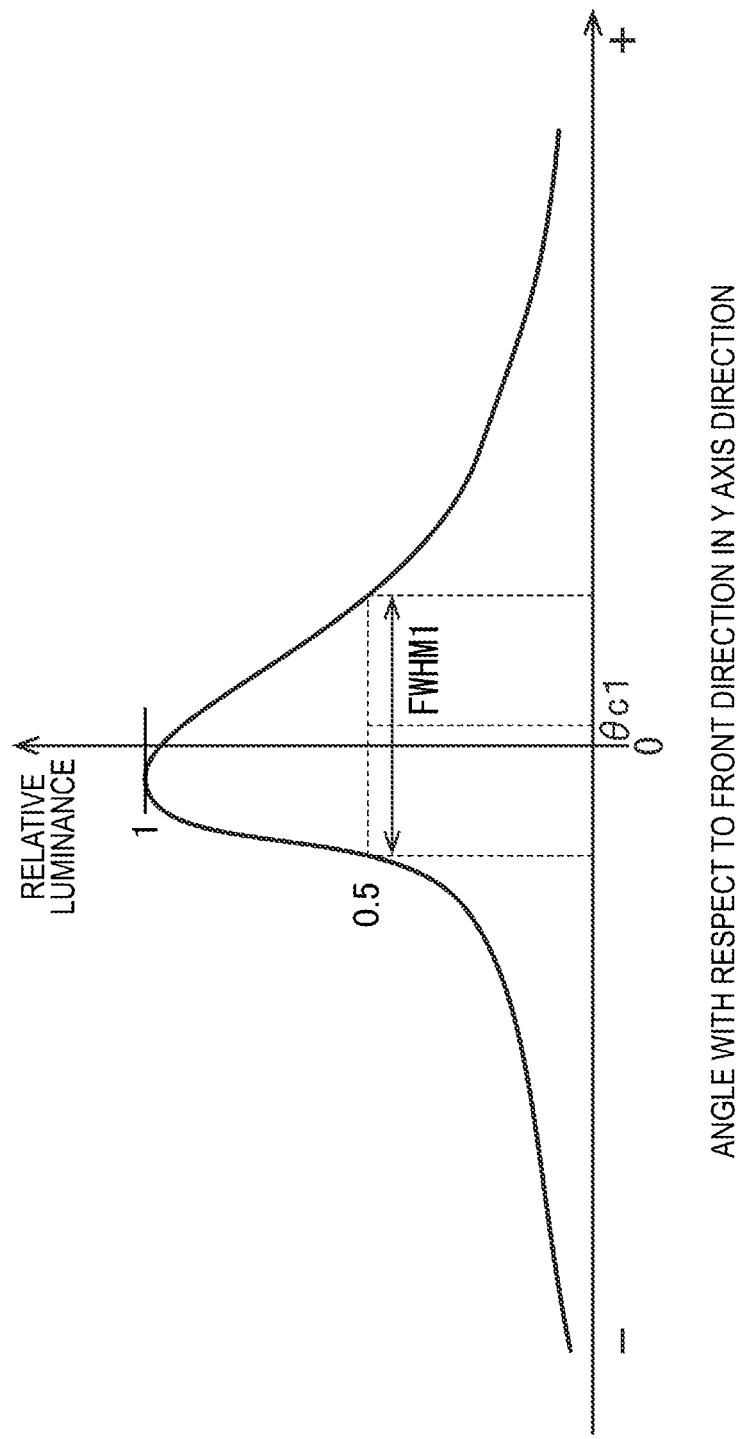
FIG. 6 is a graph illustrating a luminance angle distribution in a Y axis direction of the emission light of the backlight device.

In this way, as shown in FIG. 4, since the refraction effect is selectively imparted to the light emitted from the light emission surface 17*b* of the center directive prism sheet 17 so as to be directed to a center side of the liquid crystal panel 11 in the Y axis direction, utilization efficiency of light in the Y axis direction is improved and front luminance of the liquid crystal panel 11 in the Y axis direction is improved. The configuration in which "the front luminance of the liquid crystal panel 11 in the Y axis direction is improved" denotes that the luminance of the reference level or higher luminance can be always obtained from a center position to both end positions of the display surface 11*a* in the Y axis direction when a user views the display surface 11*a* of the liquid crystal panel 11 at a position facing the front direction in the Y axis direction. On the other hand, according to the refraction effect imparted to the emission light by the center directive prism sheet 17, as shown in FIG. 6, in the luminance angle distribution indicating the luminance of the emission light at each angle with respect to the light emission surface 17*b* (light emission surface 12*a*), a much light emission angle range in which an emission light quantity is relatively much and a less light emission angle range in which the emission light quantity is relatively less are included. FIG. 6 shows a graph illustrating the luminance angle distribution of the emission light of the backlight device 12, and a horizontal axis denotes an angle with respect to the front direction in the Y axis direction and a vertical axis denotes relative luminance of the emission light. In the angle in the horizontal axis in FIG. 6, a − (minus) side (a left side in FIG. 6) with respect to 0 degrees (front direction) serving as a reference corresponds to the side of the LED 13 (the side of the light incident end surface 15*b*) in the Y axis direction, and a + (plus) side (a right side in FIG. 6) with respect to 0 degrees corresponds to the opposite side (the side of the light incident opposite end surface 15*d*) opposite to the side of the LED 13 in the Y axis direction. The relative luminance in the vertical axis in FIG. 6 is a relative value as a maximum luminance value of the emission light is set to a reference (1.0).

The luminance angle distribution according to the emission light from the light emission surface 17*b* of the center directive prism sheet 17 shown in FIG. 6 is described in detail. As described above, the refraction effect is imparted to the light incident on the prism 19*a* of the center directive prism sheet 17 from the light emission plate surface 15*a* of the light guide plate 15, mainly by the LED opposite side inclined surface 19*a*2 among the both inclined surfaces 19*a*2 and 19*a*3 of the prism 19*a*. Thus, the light to which the refraction effect is added by the LED opposite side inclined surface 19*a*2 is mainly directed to a side opposite to the side of the LED 13 with respect to the front direction in the Y axis direction. As a result, in the luminance angle distribution according to the emission light from the light emission surface 17*b* of the center directive prism sheet 17, the opposite side (the + (plus) side, the right side in FIG. 6) opposite to the side of the LED 13 with respect to the front direction in the Y axis direction serves as the much light emission angle range, and the side of the LED 13 (the − (minus) side, the left side in FIG. 6) with respect to the front direction in the Y axis direction serves as the less light emission angle range. That is, in the emission light of the backlight device 12, the front luminance is improved by the light condensed selectively in the Y axis direction by the center directive prism sheet 17; however a user is apt to recognize that the opposite side opposite to the side of the LED 13 with respect to the front direction in the Y axis direction is relatively bright and the side of the LED 13 with respect to the front direction in the Y axis direction is relatively dark. As a result, the luminance unevenness might be generated. In this way, in a case in which the much light emission angle range and the less light emission angle range are included in the luminance angle distribution according to the emission light from the light emission surface 17b of the center directive prism sheet 17, a center angle θc1 of the full width at half maximum FWHM1 of the luminance of the emission light is shifted from 0 degrees to a side of the much light emission angle range (the opposite side opposite to the side of the LED 13).

Figure 7:
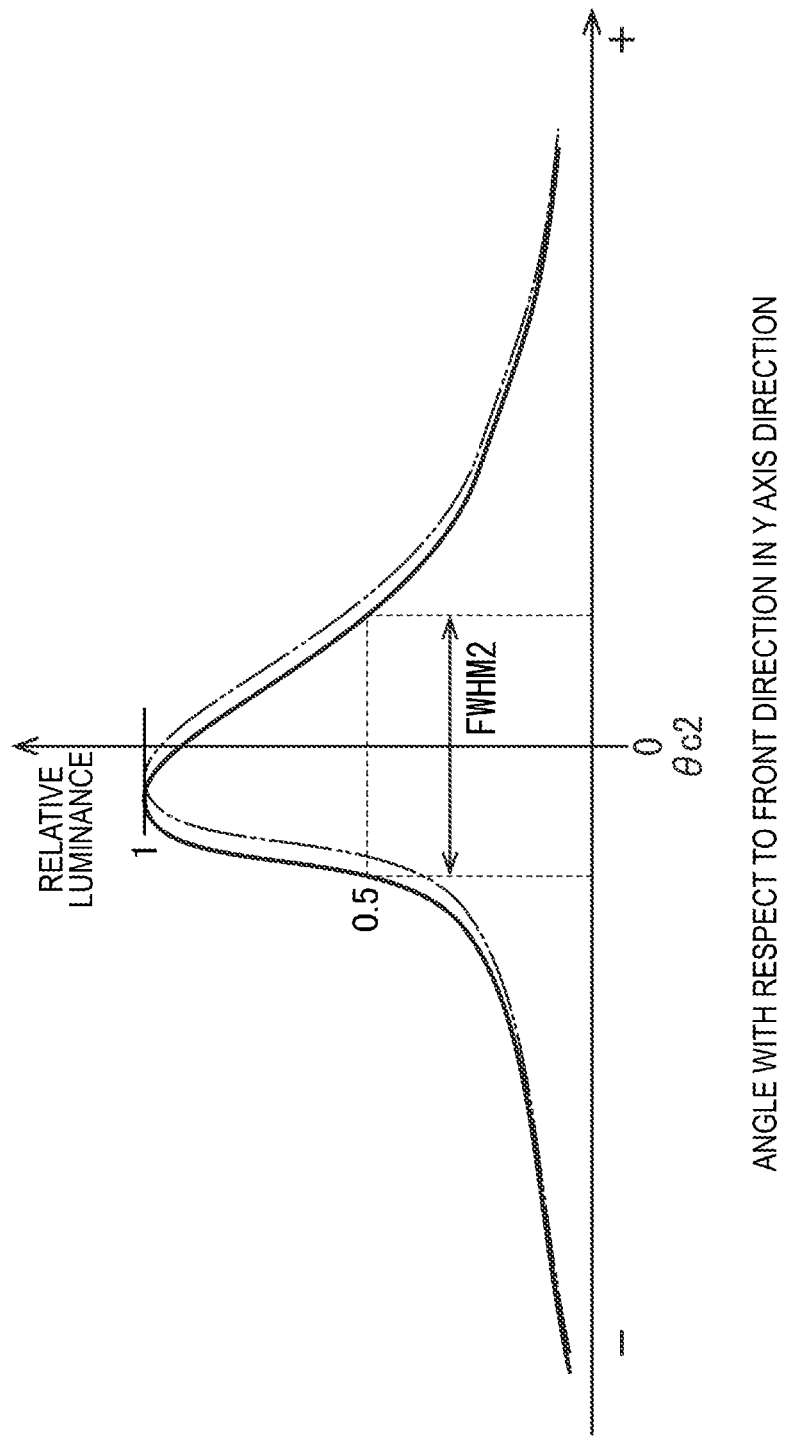
FIG. 7 is a graph illustrating a luminance angle distribution in the Y axis direction of the emission light of the asymmetric linear Fresnel lens sheet.

Against this, as shown in FIG. 3, the liquid crystal display device 10 is provided with an asymmetric linear Fresnel lens sheet (asymmetric light refraction member) 20 in addition to the liquid crystal panel 11 and the backlight device 12 having the configuration described above. The asymmetric linear Fresnel lens sheet 20 is arranged to be overlapped with the liquid crystal panel 11 at the back side thereof, namely a side of the backlight device 12, in the Z axis direction, in other words the asymmetric linear Fresnel lens sheet 20 is arranged to be interposed (sandwiched) between the liquid crystal panel 11 and the backlight device 12. The asymmetric linear Fresnel lens sheet 20 is configured to impart an asymmetric refraction effect in the Y axis direction to the emission light from the light emission surface 12a (light emission surface 17b) of the backlight device 12 (center directive prism sheet 17). When the asymmetric refraction effect in the Y axis direction is imparted to the emission light from the light emission surface 17b of the center directive prism sheet 17 by the asymmetric linear Fresnel lens sheet 20, the light in the less light emission angle range in the luminance angle distribution according to the light emitted from the light emission surface 17b is directed to the side same as the less light emission angle range, while at least a part of the light in the much light emission angle range in the luminance angle distribution is directed to the side of the less light emission angle range. With this, as shown in FIG. 7, the luminance angle distribution according to the light emission surface 20b of the asymmetric linear Fresnel lens sheet 20 is corrected such that the luminance (emission light quantity) in an angle range at the plus side with respect to the front direction in the Y axis direction is substantially equal to the luminance in an angle range at the minus side. Accordingly, the emission light of the backlight device 12 (center directive prism sheet 17) is made uniform in a surface of the light emission surface 12a (light emission surface 17b), and thereby the luminance unevenness is hardly generated and the display quality is improved. In addition, since the asymmetric linear Fresnel lens sheet 20 is arranged to be overlapped with the liquid crystal panel 11 at the side of the backlight device 12, the emission light of the asymmetric linear Fresnel lens sheet 20 is emitted to an outside after transmitting the liquid crystal panel 11. Accordingly, an interference fringe or the like caused by curved surface lenses 22a described below is hardly seen in the emission light of the asymmetric linear Fresnel lens sheet 20, and as a result, superior display quality can be obtained. In addition, since the asymmetric linear Fresnel lens sheet 20 is protected by the liquid crystal panel 11, a foreign substance or the like is hardly stuck to the light emission surface 20b of the asymmetric linear Fresnel lens sheet 20, and thereby an optical performance of the asymmetric linear Fresnel lens sheet 20 can be favorably derived.

FIG. 7 is a graph illustrating a luminance angle distribution of the emission light of the asymmetric linear Fresnel lens sheet 20, and a horizontal axis denotes an angle with respect to the front direction in the Y axis direction and a vertical axis denotes relative luminance of the emission light. In the angle in the horizontal axis in FIG. 7, a − (minus) side (a left side in FIG. 7) with respect to 0 degrees (front direction) serving as a reference corresponds to the side of the LED 13 (the side of the light incident end surface 15b) in the Y axis direction, and a + (plus) side (a right side in FIG. 7) with respect to 0 degrees corresponds to the opposite side (the side of the light incident opposite end surface 15d) opposite to the side of the LED 13 in the Y axis direction. The relative luminance in the vertical axis in FIG. 7 is a relative value as a maximum luminance value of the emission light is set to a reference (1.0). In FIG. 7, the luminance angle distribution according to the emission light of the backlight device 12 is shown by a two-dot chain line for comparison.

Specifically, as shown in FIG. 4 and FIG. 5, the asymmetric linear Fresnel lens sheet 20 is formed in a sheet shape having a sheet thickness thinner than the plate thickness of the light guide plate 15, and a plate surface thereof is parallel to each of the plate surfaces of the liquid crystal panel 11 and the light guide plate 15. The asymmetric linear Fresnel lens sheet 20 is arranged to be overlapped with the light emission surface 17b of the center directive prism sheet 17 at the front side (light emission side) so as to impart a predetermined optical effect (asymmetric refraction effect) to the light emitted from the light emission surface 17b. Among a pair of front and back plate surfaces in the asymmetric linear Fresnel lens sheet 20, a plate surface at the back side facing the plate surface (light emission surface 17b) of the center directive prism sheet 17 serves as a light incident surface 20a on which the light from the center directive prism sheet 17 is incident, and a plate surface at the front side facing the plate surface (the plate surface opposite to the display surface 11a) of the liquid crystal panel 11 serves as a light emission surface 20b from which the light is emitted toward the liquid crystal panel 11.

More specifically, as shown in FIG. 4 and FIG. 5, the asymmetric linear Fresnel lens sheet 20 is formed by a base material 21 formed of a substantially transparent synthetic resin, and an asymmetric linear Fresnel lens portion (asymmetric light refraction portion) 22 arranged on a plate surface at a front side, namely a light emission surface 20b, of the base material 21 so as to impart a light condensing effect to the emission light. The asymmetric linear Fresnel lens portion 22 is formed by the curved surface lenses (unit asymmetric light refraction portion) 22a, each of which is protruded from the light emission surface 20b toward a front side (a light emission side, a side of the liquid crystal panel 11) along the Z axis direction. In the asymmetric linear Fresnel lens portion 22, a section taken along the X axis direction is formed in a flat shape, while a section taken along the Y axis direction is formed in a substantially serrated shape by arranging the curved surface lenses 22a in a stepped manner. The curved surface lens 22a is formed in a substantially arc shape in section taken along the Y axis direction (the normal direction of the light incident end surface 15b, the first direction) and the surface thereof is formed as a curved surface 22a1 having an arc shape, while the curved surface lens 22a is extended linearly along the X axis direction (a direction orthogonal to the normal direction of the light incident end surface 15b, the second direction). The curved surface lenses 22a are aligned along the Y axis direction in a stepped manner in the light emission surface 20b. That is, the curved surface lens 22a is formed as a so-called "linear Fresnel lens" having a curvature in the Y axis direction and not having a curvature in the X axis direction.

As shown in FIG. 4, the curved surface lenses 22a have the curved surfaces 22a1 that are different in curvature in accordance with its position in the Y axis direction (the first direction). A curvature of the curved surface 22a1 of the curved surface lens 22a located at the side opposite to the side of the LED 13 in the Y axis direction is larger than a curvature of the curved surface 22a1 of the curved surface lens 22a located at the side of the LED 13 in the Y axis direction. Specifically, among the curved surface lenses 22a, the curved surface lens 22a arranged at the side of the LED 13 (the side of the light incident end surface 15b, the left side in FIG. 4) with respect to the front direction in the Y axis direction is formed as a small curvature curved surface lens 22aA having a relatively small curvature, and the curved surface lens 22a arranged at the side (the side of the light incident opposite end surface 15d, the right side in FIG. 4) opposite to the side of the LED 13 with respect to the front direction in the Y axis direction is formed as a large curvature curved surface lens 22aB having a relatively large curvature. Hereinafter, in distinguishing the curved surface lenses 22a, the curved surface lens 22a arranged at the side of the LED 13 with respect to the front direction in the Y axis direction is described as "the small curvature curved surface lens" with a suffix of A imparted to the reference symbol thereof, and the curved surface lens 22a arranged at the side opposite to the side of the LED 13 with respect to the front direction in the Y axis direction is described as "the large curvature curved surface lens" with a suffix of B imparted to the reference symbol thereof. In a case in which the curved surface lens 22a is described as a component without distinguishing the curved surface lenses 22a, a suffix is not imparted to the reference symbol thereof. An arrangement in the Y axis direction of the small curvature curved surface lens 22aA in the light emission surface 20b of the asymmetric linear Fresnel lens sheet 20 is set in the less light emission angle range in the luminance angle distribution according to the emission light from the light emission surface 17b of the center directive prism sheet 17. On the other hand, an arrangement in the Y axis direction of the large curvature curved surface lens 22aB in the light emission surface 20b of the asymmetric linear Fresnel lens sheet 20 is set in the much light emission angle range in the luminance angle distribution according to the emission light from the light emission surface 17b of the center directive prism sheet 17. In a case in which distances from the front direction (0 degrees) in the Y axis direction are the same, a protrusion height of the large curvature curved surface lens 22aB in the curved surface lens 22a from the base material 21 is larger than a protrusion height of the small curvature curved surface lens 22aA in the curved surface lens 22a from the base material 21.

According to the asymmetric linear Fresnel lens portion 22 having such a configuration, the asymmetric refraction effect is imparted to the emission light from the light emission surface 17b of the center directive prism sheet 17 in accordance with the position in the Y axis direction. Specifically, as shown in FIG. 4, a relatively small refraction effect is imparted to the light at the side of the LED 13 with respect to the front direction in the Y axis direction, namely the light in the less light emission angle range, among the emission light from the light emission surface 17b of the center directive prism sheet 17, by the curved surface 22a1 having a relatively small curvature in the small curvature curved surface lens 22aA, and thereby almost all of the light emission range coincides with the less light emission angle range. On the other hand, a relatively large refraction effect is imparted to the light at the side opposite to the side of the LED 13 with respect to the front direction in the Y axis direction, namely the light in the much light emission angle range, among the emission light from the light emission surface 17b of the center directive prism sheet 17, by the curved surface 22a1 having a relatively large curvature in the large curvature curved surface lens 22aB, and thereby the most part of the light emission range coincides with the much light emission angle range, while a part of the light emission range coincides with the less light emission angle range. In this way, a part of the light travelling toward the much light emission angle range in the Y axis direction from the light emission surface 17b of the center directive prism sheet 17 is directed to the less light emission angle range in the Y axis direction by the large curvature curved surface lens 22aB, and thereby, as shown in FIG. 7, in the emission light from the light emission surface 20b of the asymmetric linear Fresnel lens sheet 20, the luminance (emission light quantity) at the side of the LED 13 with respect to the front direction in the Y axis direction and the luminance at the side opposite to the side of the LED 13 with respect to the front direction in the Y axis direction are substantially equal to each other. With this, the generation of the luminance unevenness can be suppressed.

In addition, as shown in FIG. 7, the asymmetric linear Fresnel lens sheet 20 imparts the asymmetric refraction effect to the emission light of the center directive prism sheet 17 such that the center angle of the full width at half maximum of the luminance in the luminance angle distribution indicating the luminance of the emission light at each angle with respect to the light emission surface 20b of the asymmetric linear Fresnel lens sheet 20 is equal to 0 degrees (front direction). As described above, in the luminance angle distribution according to the emission light from the light emission surface 17b of the center directive prism sheet 17, the center angle θc1 of the full width at half maximum FWHM1 of the luminance is shifted from 0 degrees to the side of the much light emission angle range (the opposite side opposite to the side of the LED 13) (see FIG. 6). Against this, when the asymmetric refraction effect is imparted to the emission light of the center directive prism sheet 17 by the asymmetric linear Fresnel lens sheet 20, the luminance angle distribution according to the emission light from the light emission surface 20b of the asymmetric linear Fresnel lens sheet 20 is shifted to a side of the less light emission angle range (the side of the LED 13), and as a result, a center angle θc2 of the full width at half maximum FWHM2 of the luminance in the luminance angle distribution according to the emission light from the light emission surface 20b of the asymmetric linear Fresnel lens sheet 20 coincides with 0 degrees. With this, in the emission light from the light emission surface 20b of the asymmetric linear Fresnel lens sheet 20, the luminance (emission light quantity) is equalized at the side of the LED 13 and at the side opposite to the side of the LED 13 with respect to the front direction in the Y axis direction, and thereby the luminance unevenness is further hardly generated.

As described above, the liquid crystal display device (display device) 10 of the present embodiment is provided with: the liquid crystal panel (display panel) 11; the backlight device (lighting device) 12 having the light emission surface 12a that emits the light toward the liquid crystal panel 11; the LED (light source) 13 installed in the backlight device 12; the center directive prism sheet (center directive light refraction member) 17 installed in the backlight device 12 to face the liquid crystal panel 11, wherein the center directive prism sheet 17 imparts at the refraction effect to at least the light emitted from the light emission surface 12a to be directed to the center side of the liquid crystal panel 11, so that the much light emission angle range in which the emission light quantity is relatively much and the less light emission angle range in which the emission light quantity is relatively less are generated in the luminance angle distribution indicating the luminance of the emission light at each angle with respect to the light emission surface 12a; and the asymmetric linear Fresnel lens sheet (asymmetric light refraction member) 20 arranged to be overlapped with the liquid crystal panel 11 at the side of the backlight device 12, wherein the asymmetric linear Fresnel lens sheet 20 imparts the asymmetric refraction effect to the emission light of the center directive prism sheet 17 such that the light in the less light emission angle range is directed to the side of the less light emission angle range, while at least a part of the light in the much light emission angle range among the emission light of the center directive prism sheet 17 is directed to the side of the less light emission angle range.

With such a configuration, the image can be displayed on the liquid crystal panel 11 by using the light emitted from the backlight device 12. When the light is emitted from the LED 13 installed in the backlight device 12, the refraction effect is imparted to at least the light emitted from the light emission surface 12a by the center directive prism sheet 17 facing the liquid crystal panel 11 so as to be directed to the center side of the liquid crystal panel 11, so that the utilization efficiency of the light can be improved and the front luminance of the liquid crystal panel 11 can be improved. On the other hand, according to the refraction effect imparted to the emission light by the center directive prism sheet 17, the much light emission angle range in which the emission light quantity is relatively much and the less light emission angle range in which the emission light quantity is relatively less are included in the luminance angle distribution indicating the luminance of the emission light at each angle with respect to the light emission surface 12a. Against this, the asymmetric refraction effect is imparted to the emission light of the center directive prism sheet 17 by the asymmetric linear Fresnel lens sheet 20 arranged to be overlapped with the liquid crystal panel 11 at the side of the backlight device 12 such that the light in the less light emission angle range is directed to the side of the less light emission angle range, while at least a part of the light in the much light emission angle range among the emission light of the center directive prism sheet 17 is directed to the side of the less light emission angle range, so that the emission light of the liquid crystal display device 10 is made uniform in a surface of the light emission surface 12a and therefore the luminance unevenness is hardly generated. With this, the display quality is improved. Further, since a light beam refraction unit that refracts a main light beam outward as in the conventional one is not provided, the liquid crystal display device 10 is kept to be small.

The asymmetric linear Fresnel lens sheet 20 imparts the asymmetric refraction effect to the emission light of the center directive prism sheet 17 such that the center angle θc2 of the full width at half maximum FWHM2 of the luminance in the luminance angle distribution indicating the luminance of the emission light at each angle with respect to the light emission surface 20b of the asymmetric linear Fresnel lens sheet 20 coincides with 0 degrees. When the much light emission angle range and the less light emission angle range are included in the luminance angle distribution indicating the luminance of the emission light at each angle with respect to the light emission surface 12a of the backlight device 12, the center angle θc1 of the full width at half maximum FWHM1 of the luminance of the emission light is shifted from 0 degrees. Against this, since the asymmetric refraction effect is imparted to the emission light of the center directive prism sheet 17 by the asymmetric linear Fresnel lens sheet 20, the center angle θc2 of the full width at half maximum FWHM2 of the luminance in the lumi- nance angle distribution indicating the luminance of the emission light at each angle with respect to the light emission surface 20b of the asymmetric linear Fresnel lens sheet 20 coincides with 0 degrees. With this, the luminance unevenness is hardly generated.

The backlight device 12 is provided with the light guide plate 15 having a plate shape. In the guide plate 15, one of the outer peripheral end surfaces serves as the light incident end surface 15b on which the light is incident and which faces the LED 13, and one of the plate surfaces serves as the light emission plate surface 15a that emits the light. The center directive prism sheet 17 is provided with the light incident surface 17a facing the light emission plate surface 15a of the light guide plate 15, and the prisms 19a aligned along the normal direction of the light incident end surface 15b in the light incident surface 17a, each of the prisms 19a being extended along the orthogonal direction orthogonal to the normal direction and having the apex part 19a1 and a pair of the inclined surfaces 19a2 and 19a3 interposing the apex part 19a1. With such a configuration, the prisms 19a aligned along the normal direction of the light incident end surface 15b, each of the prisms 19a being extended along the orthogonal direction orthogonal to the normal direction of the light incident end surface 15b of the light guide plate 15 in the light incident surface 17a of the center directive prism sheet 17, imparts the refraction effect to the light mainly on the inclined surfaces 19a2 and 19a3 at the side opposite to the side of the LED 13 in the normal direction with respect to the apex part 19a1. In this way, by using the emission light of the center directive prism sheet 17 to which the refraction effect in the normal direction of the light incident end surface 15b is added, the front luminance of the liquid crystal panel 11 is improved; however in the luminance angle distribution indicating the luminance of the emission light at each angle with respect to the light emission surface 12a of the backlight device 12, the angle range at the side of the LED 13 in the normal direction of the light incident end surface 15b is apt to be the less light emission angle range, and thereby the luminance unevenness might be generated. Against this, since the asymmetric refraction effect is imparted to at least a part of the light in the much light emission angle range in the emission light of the center directive prism sheet 17 by the asymmetric linear Fresnel lens sheet 20 to be directed to the side of the less light emission angle range, the luminance unevenness as described above is hardly generated.

The asymmetric linear Fresnel lens sheet 20 is arranged to be overlapped with the liquid crystal panel 11 at the side of the backlight device 12. With such a configuration, since the emission light of the asymmetric linear Fresnel lens sheet 20 is emitted to an outside after transmitting the liquid crystal panel 11, the interference fringe or the like possibly generated in the emission light of the asymmetric linear Fresnel lens sheet 20 is hardly seen, and thereby the superior display quality can be obtained. In addition, since the asymmetric linear Fresnel lens sheet 20 is protected by the liquid crystal panel 11, a foreign substance or the like is hardly stuck to the asymmetric linear Fresnel lens sheet 20, and thereby the optical performance of the asymmetric linear Fresnel lens sheet 20 can be favorably derived.

The center directive prism sheet 17 imparts the refraction effect to the light selectively in the first direction along the light emission surface 12a. The asymmetric linear Fresnel lens sheet 20 is provided with the base material 21, and the curved surface lens 22a having a surface formed in a curved shape and arranged on the light emission surface 20b of the base material 21 from which the light is emitted. In the curved surface lens 22a, the curvature of the curved surface 22a1, which is a surface of the curved surface lens 22a, in the much light emission angle range is larger in the first direction than the curvature of the curved surface 22a1 in the less light emission angle range. With such a configuration, when the light is emitted from the LED 13, since the refraction effect is selectively imparted to the light in the first direction along the light emission surface 12a of the backlight device 12 by the center directive prism sheet 17, the utilization efficiency of the light in the first direction is improved and the front luminance of the liquid crystal panel 11 in the first direction is improved. On the other hand, in the asymmetric linear Fresnel lens sheet 20, the surface of the curved surface lens 22a arranged on the light emission surface 20b of the base material 21 is formed in a curved shape, and thereby the asymmetric linear Fresnel lens sheet 20 imparts the refraction effect to the emission light of the center directive prism sheet 17. Since the curvature of the curved surface 22a1, which is a surface of the curved surface lens 22a in the asymmetric linear Fresnel lens sheet 20, in the much light emission angle range is set to be larger than the curvature in the less light emission angle range in the first direction, a relatively large refraction effect is imparted to at least a part of the light in the much light emission angle range among the emission light of the center directive prism sheet 17 by the curved surface 22a1, which is a surface of the curved surface lens 22a, and therefore the light is directed to the side of the less light emission angle range. On the other hand, a relatively small refraction effect is imparted to the light in the less light emission angle range among the emission light of the center directive prism sheet 17 by the curved surface 22a1, which is a surface of the curved surface lens 22a, and thereby the light is directed to the side of the less light emission angle range. In this way, the asymmetric refraction effect is imparted to the light, and thereby the luminance unevenness is hardly generated.

The asymmetric linear Fresnel lens sheet 20 is formed as a linear Fresnel lens in which the curved surface lens 22a is extended linearly in the second direction orthogonal to the first direction and the curved surface lenses 22a are aligned along the first direction. In the linear Fresnel lenses, the curvature of the curved surface 22a1, which is a surface of the linear Fresnel lens arranged at the side of the much light emission angle range in the first direction, is larger than the curvature of the curved surface 22a1, which is a surface of the linear Fresnel lens arranged at the side of the less light emission angle range. With such a configuration, the relatively large refraction effect is imparted to at least a part of the light in the much light emission angle range among the emission light of the center directive prism sheet 17 by the curved surface 22a1, which is a surface of the linear Fresnel lens arranged at the side of the much light emission angle range in the first direction, and thereby the light is directed to the side of the less light emission angle range. On the other hand, the relatively small refraction effect is imparted to the light in the less light emission angle range among the emission light of the center directive prism sheet 17 by the curved surface 22a1, which is a surface of the linear Fresnel lens arranged at the side of the less light emission angle range in the first direction, and thereby the light is directed to the side of the less light emission angle range. In this way, the asymmetric refraction effect is imparted to the light, and thereby the luminance unevenness is hardly generated.

The head-mounted display HMD according the present embodiment is provided with at least the liquid crystal display device 10, the lens portion RE that images the image, which is displayed on the liquid crystal display device 10, in an eye ball (eye) EY of a user, and the head-mounted instrument HMDa having the liquid crystal display device 10 and the lens portion RE and mounted to the head HD of the user. According to the head-mounted display HMD having such a configuration, when the user uses the head-mounted display HMD in a state in which the head-mounted instrument HMDa is mounted to the head HD, the image displayed on the liquid crystal display device 10 is imaged in the eye EY of the user through the lens portion RE, and accordingly the user can view the enlarged image of the image displayed on the liquid crystal display device 10. Here, since the refraction effect is imparted to the light emitted from the end side of the light emission surface 12a of the backlight device 12 installed in the liquid crystal display device 10, by the center directive prism sheet 17 to be directed to the center side of the liquid crystal panel 11, the light can be delivered efficiently to the eye EY of the user that views the enlarged image of the image displayed on the liquid crystal panel 11. With this, the superior display quality can be obtained, and reduction of a production cost and improvement of productivity according the head-mounted display HMD can be achieved.

Second Embodiment

A second embodiment of the present invention will be described with reference to FIG. 8. In the second embodiment, a configuration in which an arrangement of an asymmetric linear Fresnel lens sheet 120 is modified is described. An overlapped description relating to a configuration, a function and an effect similar to those of the first embodiment, is omitted.

Figure 8:
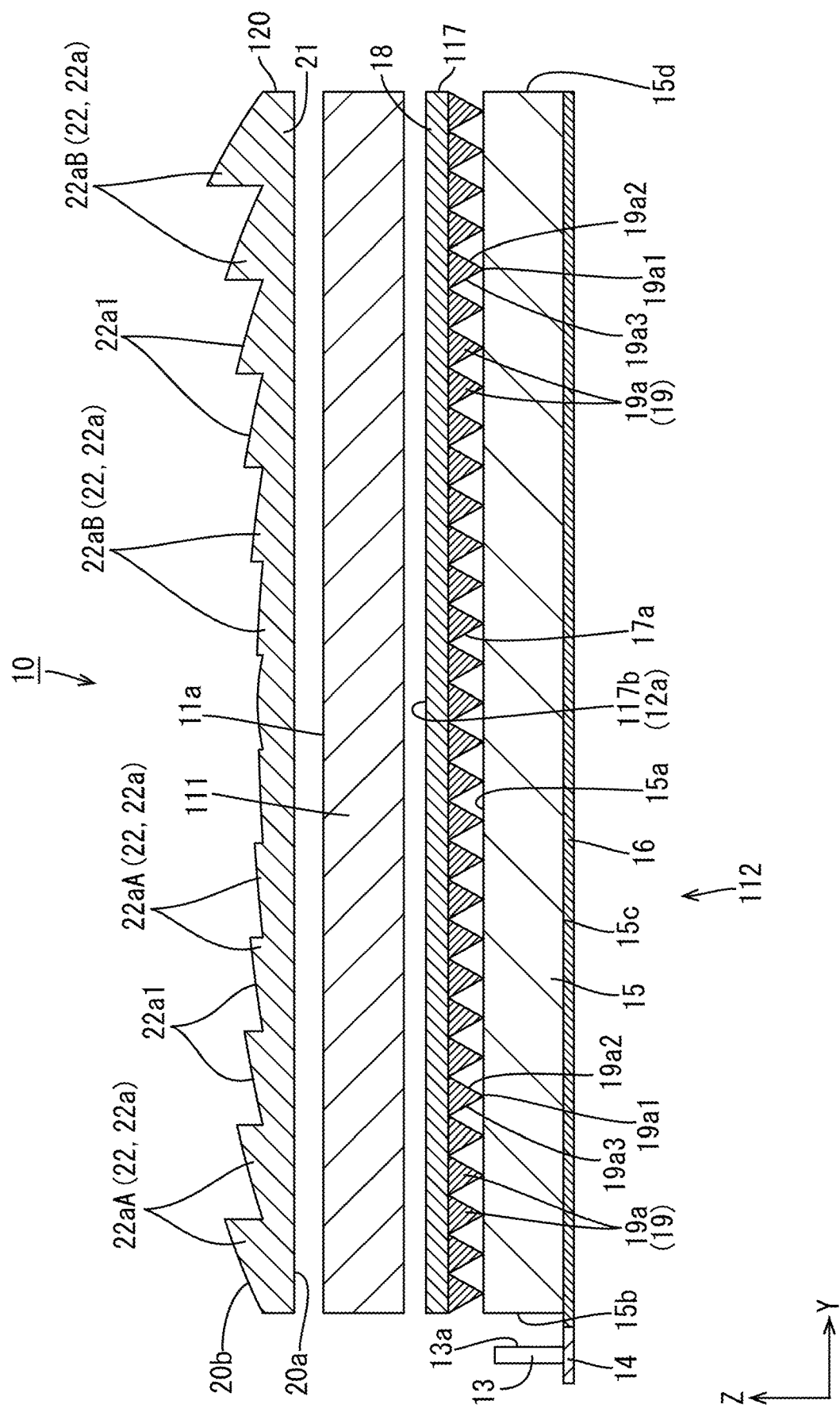
FIG. 8 is a cross-sectional view taken along a long side direction of a liquid crystal display device according to a second embodiment of the present invention.

As shown in FIG. 8, the asymmetric linear Fresnel lens sheet 120 according to the present embodiment is arranged to be overlapped with a liquid crystal panel 111 at a front side, namely an opposite side opposite to a backlight device 112. Accordingly, the emission light from a light emission surface 117b of a center directive prism sheet 117 is incident on a light incident surface 120a of the asymmetric linear Fresnel lens sheet 120 after transmitting the liquid crystal panel 111, so that an asymmetric refraction effect in the Y axis direction (first direction) is imparted to the light. Here, as described above in the first embodiment, in a case in which the asymmetric refraction effect in the Y axis direction is imparted to the incident light on the liquid crystal panel 11 by the asymmetric linear Fresnel lens sheet 20, it is possible that the travelling direction of the light is disordered because the light transmits the asymmetric linear Fresnel lens sheet 20. In such a case, relatively much light travelling oblique against the normal direction of the liquid crystal panel 11 is included in the light transmitting the liquid crystal panel 11, and thereby it is difficult that the light transmits the liquid crystal panel 11 efficiently (see FIG. 4). As a result, the luminance when a gradation of the liquid crystal panel 11 is set to a maximum value is decreased, and thereby contrast performance might be deteriorated (see FIG. 4). Compared to this, in the present embodiment, the asymmetric refraction effect due to the asymmetric linear Fresnel lens sheet 120 is imparted to the emission light of the liquid crystal panel 111, and therefore relatively much light travelling along the normal direction of the liquid crystal panel 111 is included in the transmission light of the liquid crystal panel 111. Generally, the light travelling along the normal direction of the liquid crystal panel 111 most efficiently transmits the liquid crystal panel 111, and accordingly in a case in which relatively much light travelling along the normal direction of the liquid crystal panel 111 is included in the light transmitting the liquid crystal panel 111 as described above, the luminance when the gradation of the liquid crystal panel 111 is set to a maximum value is made high. With this, a luminance difference between the luminance when the gradation of the liquid crystal panel 111 is set to a maximum value and the luminance when the gradation of the liquid crystal panel 111 is set to a minimum value is made sufficiently large, and thereby the superior contrast performance can be obtained.

As described above, according to the present embodiment, the asymmetric linear Fresnel lens sheet 120 is arranged to be overlapped with the liquid crystal panel 111 at the opposite side opposite to the backlight device 112. With such a configuration, the asymmetric refraction effect is imparted to the emission light of the liquid crystal panel 111 by the asymmetric linear Fresnel lens sheet 120, and thereby much more light travelling along the normal direction of the liquid crystal panel 111 is included in the light transmitting the liquid crystal panel 111, compared to a configuration in which the asymmetric refraction effect is imparted to the incident light on the liquid crystal panel 111 by the asymmetric linear Fresnel lens sheet. Generally, the light travelling along the normal direction of the liquid crystal panel 111 most efficiently transmits the liquid crystal panel 111, and accordingly in a case in which much more light travelling along the normal direction of the liquid crystal panel 111 is included in the light transmitting the liquid crystal panel 111 as described above, the luminance when the gradation of the liquid crystal panel 111 is set to a maximum value is made high. With this, a luminance difference between the luminance when the gradation of the liquid crystal panel 111 is set to a maximum value and the luminance when the gradation of the liquid crystal panel 111 is set to a minimum value is made sufficiently large, and thereby the superior contrast performance can be obtained.

Third Embodiment

A third embodiment of the present invention will be described with reference to FIG. 9 or FIG. 10. In the third embodiment, a configuration in which a symmetric linear Fresnel lens sheet 23 is imparted to the configuration described in the first embodiment is described. An overlapped description relating to a configuration, a function and an effect similar to those of the first embodiment, is omitted.

Figure 9:
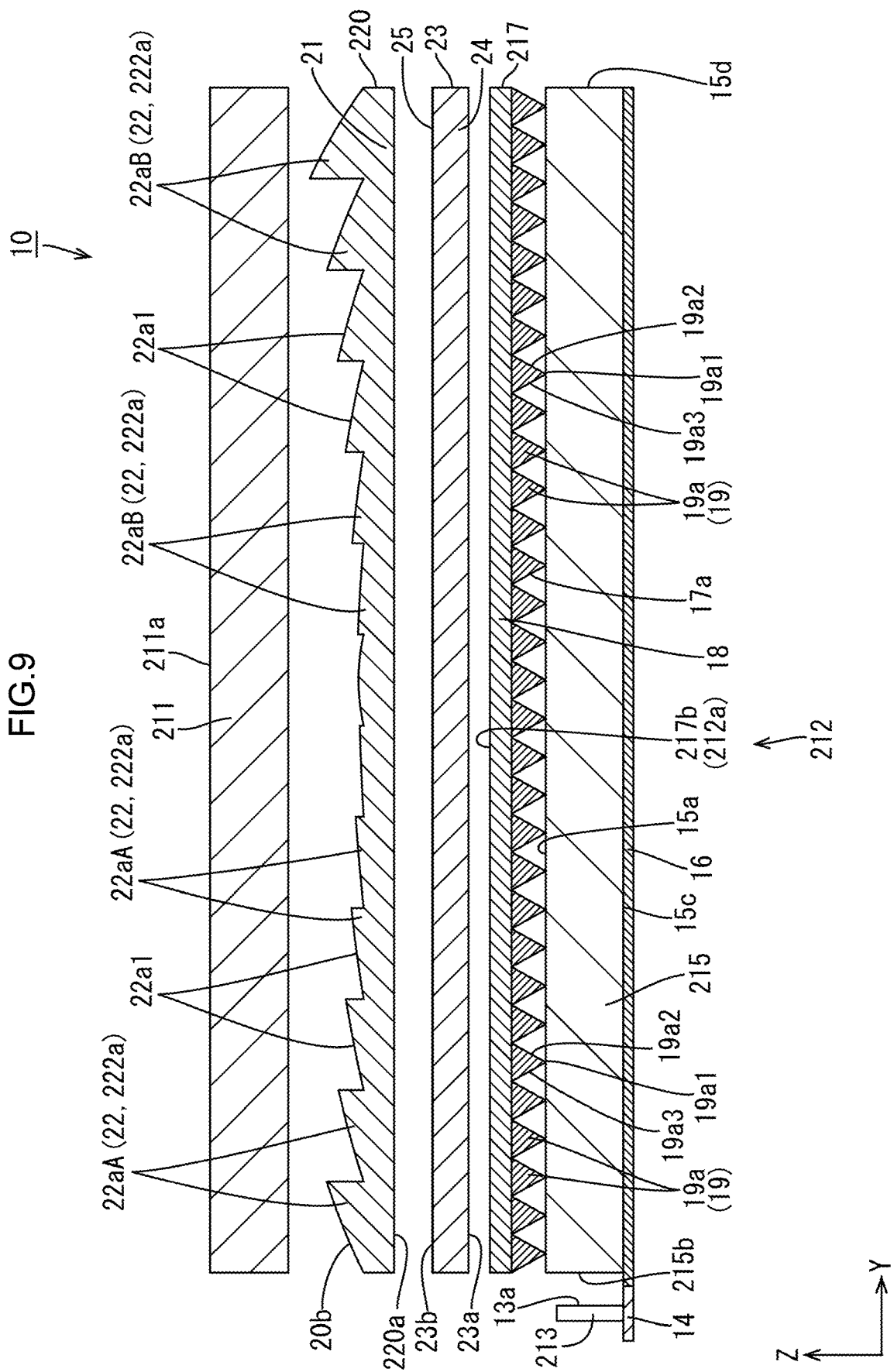
FIG. 9 is a cross-sectional view taken along a long side direction of a liquid crystal display device according to a third embodiment of the present invention.
Figure 10:
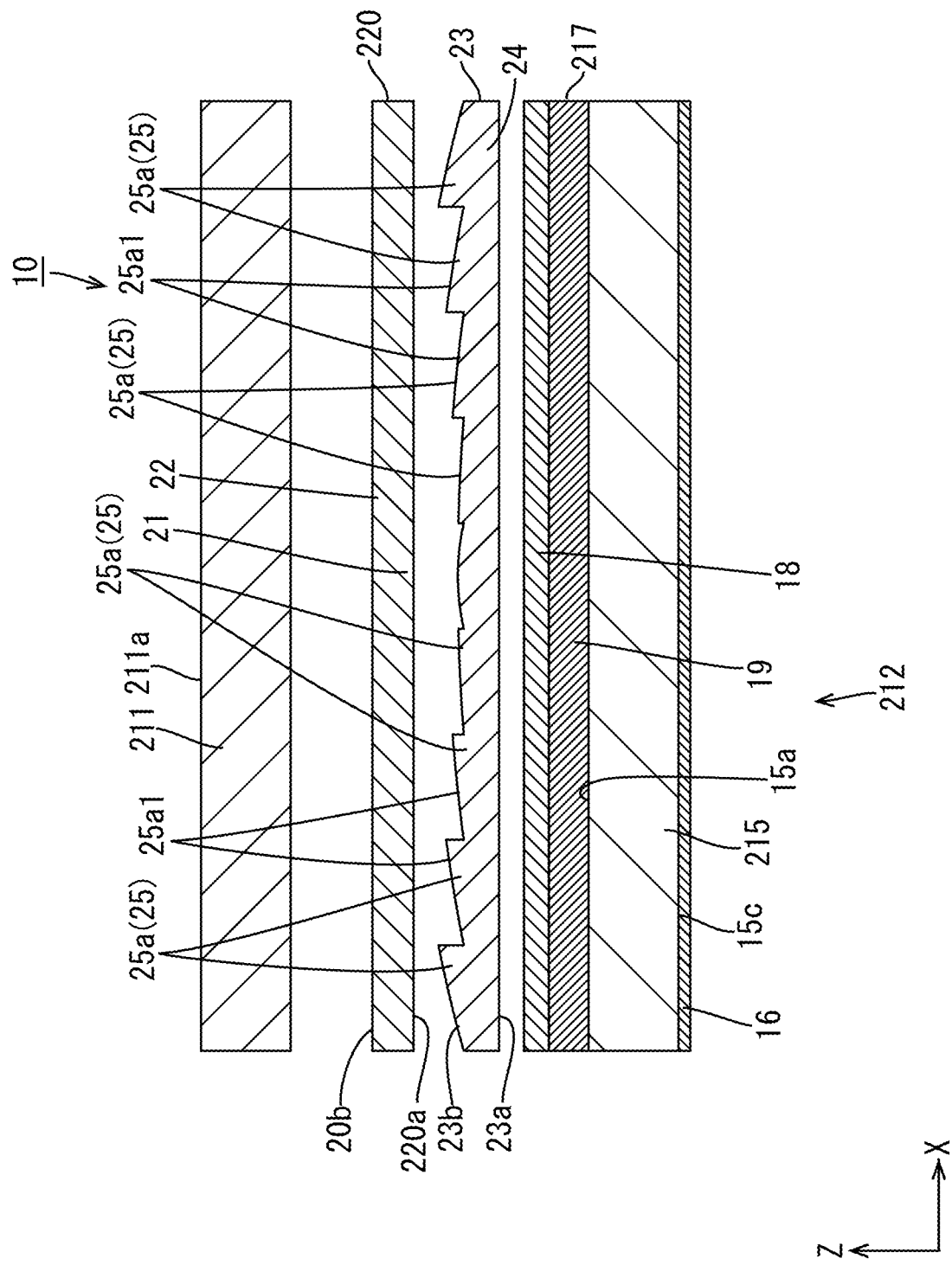
FIG. 10 is a cross-sectional view taken along a short side direction of the liquid crystal display device.

As shown in FIG. 9 and FIG. 10, the symmetric linear Fresnel lens sheet (symmetric light refraction member) 23 is arranged to be interposed between a backlight device 212 (center directive prism sheet 217) and an asymmetric linear Fresnel lens sheet 220 according to the present embodiment. The symmetric linear Fresnel lens sheet 23 is arranged to be overlapped with the asymmetric linear Fresnel lens sheet 220 at a back side, namely a side of the backlight device 212. In other words, the symmetric linear Fresnel lens sheet 23 is arranged to be overlapped with the backlight device 212 at a front side, namely a side of the asymmetric linear Fresnel lens sheet 220. The symmetric linear Fresnel lens sheet 23 imparts a symmetric refraction effect in the X axis direction (a direction orthogonal to a normal direction of a light incident end surface 215b, a second direction) to emission light from a light emission surface 212a (light emission surface 217b) of the backlight device 212 (center directive prism sheet 217).

Specifically, as shown in FIG. 9 and FIG. 10, the symmetric linear Fresnel lens sheet 23 is formed in a sheet shape having a sheet thickness thinner than a plate thickness of a light guide plate 215. A plate surface of the symmetric linear Fresnel lens sheet 23 is parallel to each plate surfaces of a liquid crystal panel 211 and the light guide plate 215. In the symmetric linear Fresnel lens sheet 23, among a pair of front and back plate surfaces, a plate surface at a back side facing a plate surface (light emission surface 217b) of the center directive prism sheet 217 serves as a light incident surface 23a on which the light emitted from the center directive prism sheet 217 is incident, and a plate surface at a front side facing a plate surface (light incident surface 220a) of the asymmetric linear Fresnel lens sheet 220 serves as a light emission surface 23b from which the light is emitted toward the asymmetric linear Fresnel lens sheet 220.

More specifically, as shown in FIG. 9 and FIG. 10, the symmetric linear Fresnel lens sheet 23 is formed by a base material 24 formed of a substantially transparent synthetic resin, and a symmetric linear Fresnel lens portion (symmetric light refraction portion) 25 arranged on a plate surface of the base material 24 at the front side, namely arranged on the light emission surface 23b, so as to impart a light condensing effect to the emission light. The symmetric linear Fresnel lens portion 25 is formed by curved surface lenses (unit symmetric light refraction portion) 25a protruded toward the front side (a light emission side, a side of the asymmetric linear Fresnel lens sheet 220) from the light emission surface 23b along the Z axis direction. In the symmetric linear Fresnel lens portion 25, a section taken along the Y axis direction (the normal direction of the light incident end surface 215b, the first direction) is formed in a flat shape, while a section taken along the X axis direction (a direction orthogonal to the normal direction of the light incident end surface 215b, the second direction) is formed in a substantially serrated shape by arranging the curved surface lenses 25a in a stepped manner. The curved surface lens 25a is formed in a substantially arc shape in section taken along the X axis direction and the surface thereof is formed as a curved surface 25a1 having an arc shape, while the curved surface lens 25a is extended linearly along the Y axis direction. The curved surface lenses 25a are aligned along the X axis direction in a stepped manner at the light emission surface 23b. That is, the curved surface lens 25a is formed as a so-called "linear Fresnel lens" having a curvature in the X axis direction and not having a curvature in the Y axis direction. An extension direction of the curved surface lens 25a and an aligned direction of the curved surface lenses 25a are orthogonal to an extension direction of a curved surface lens 222a and an aligned direction of the curved surface lenses 222a of the asymmetric linear Fresnel lens sheet 220, respectively. Each of the curved surface lenses 25a has a uniform curvature of the curved surface 25a1 in spite of a position in the X axis direction. Accordingly, among the curved surface lenses 25a, the curved surface lenses 25a having the same distance from the front direction (0 degrees) in the X axis direction are the same in height protruded from the base material 24.

According to the symmetric linear Fresnel lens portion 25 having such a configuration, as shown in FIG. 10, since the symmetric refraction effect is selectively imparted to the emission light from the light emission surface 217b of the center directive prism sheet 217 to be directed to the center side of the liquid crystal panel 211 in the X axis direction, the utilization efficiency of the light in the X axis direction is improved and the front luminance of the liquid crystal panel 211 in the X axis direction is improved. The configuration in which "the front luminance of the liquid crystal panel 211 in the X axis direction is improved" denotes that the luminance of the reference level or higher luminance can be always obtained from a center position to both end positions of the display surface 211a in the X axis direction when a user views the display surface 211a of the liquid crystal panel 211 at a position facing the front direction in the X axis direction.

As described above, according to the present embodiment, the center directive prism sheet 217 selectively imparts the refraction effect to the light in the first direction along the light emission surface 212a, and the symmetric linear Fresnel lens sheet (symmetric light refraction member) 23 arranged to be overlapped with the asymmetric linear Fresnel lens sheet 220 at the side of the backlight device 212 so as to impart the symmetric refraction effect to the emission light of the center directive prism sheet 217 in the second direction orthogonal to the first direction, is provided. With such a configuration, when the light is emitted from the LED 213, since the refraction effect is selectively imparted to the light in the first direction along the light emission surface 212a of the backlight device 212 by the center directive prism sheet 217, the utilization efficiency of the light in the first direction is improved and the front luminance of the liquid crystal panel 211 in the first direction is improved. On the other hand, since the symmetric linear Fresnel lens sheet 23 imparts the symmetric refraction effect to the emission light of the center directive prism sheet 217 in the second direction orthogonal to the first direction, the utilization efficiency of the light in the second direction is also improved and the front luminance of the liquid crystal panel 211 in the second direction is also improved.

Fourth Embodiment

A fourth embodiment of the present invention will be described with reference to FIG. 11 to FIG. 14. In the fourth embodiment, a configuration in which an asymmetric linear Fresnel lens sheet 320 is modified in the configuration described in the first embodiment is described. An overlapped description relating to a configuration, a function and an effect similar to those of the first embodiment, is omitted.

Figure 11:
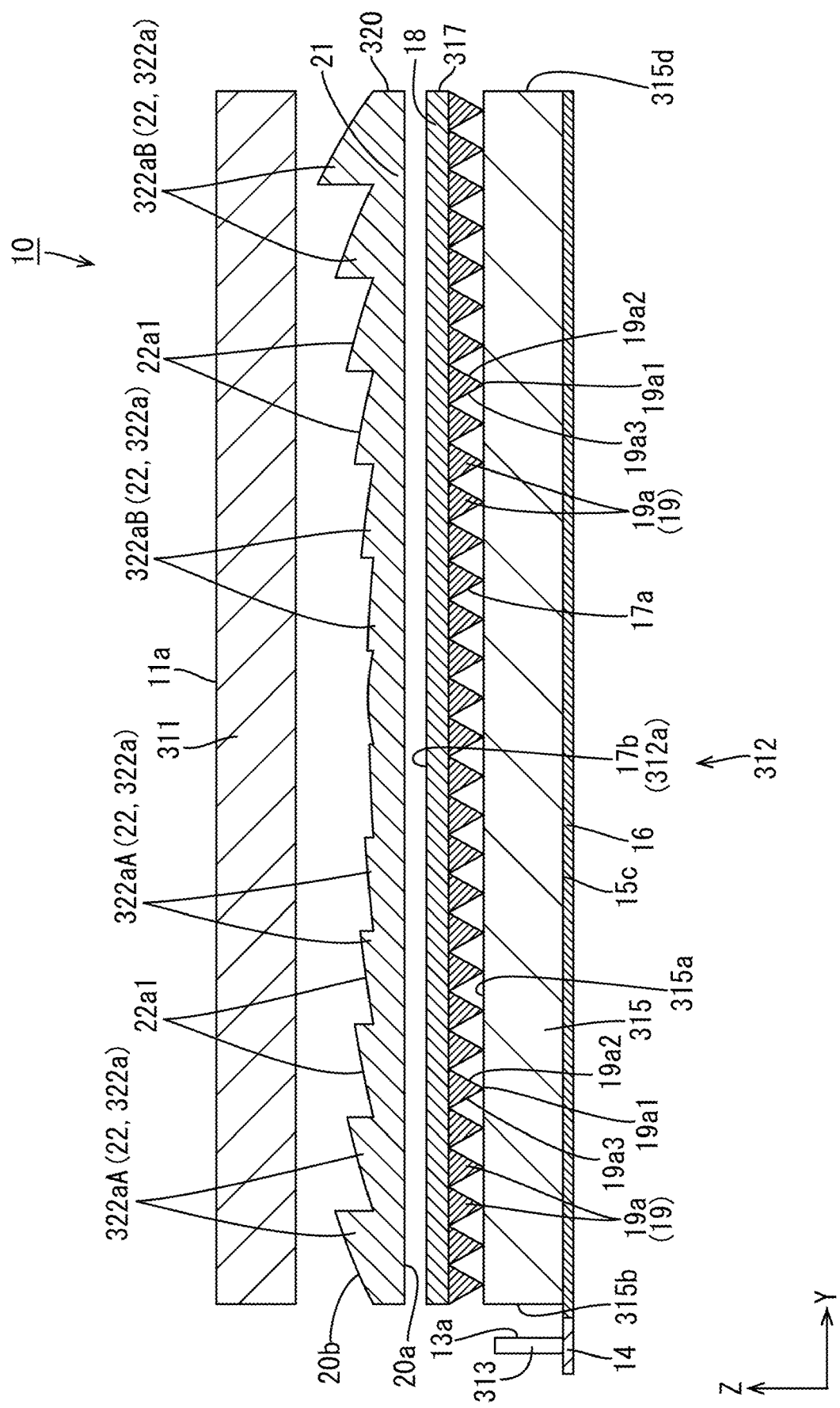
FIG. 11 is a cross-section view taken along a long side direction of a liquid crystal display device including an asymmetric linear Fresnel lens sheet in which a center position thereof coincides with that of a center directive prism sheet according to a fourth embodiment of the present invention.
Figure 12:
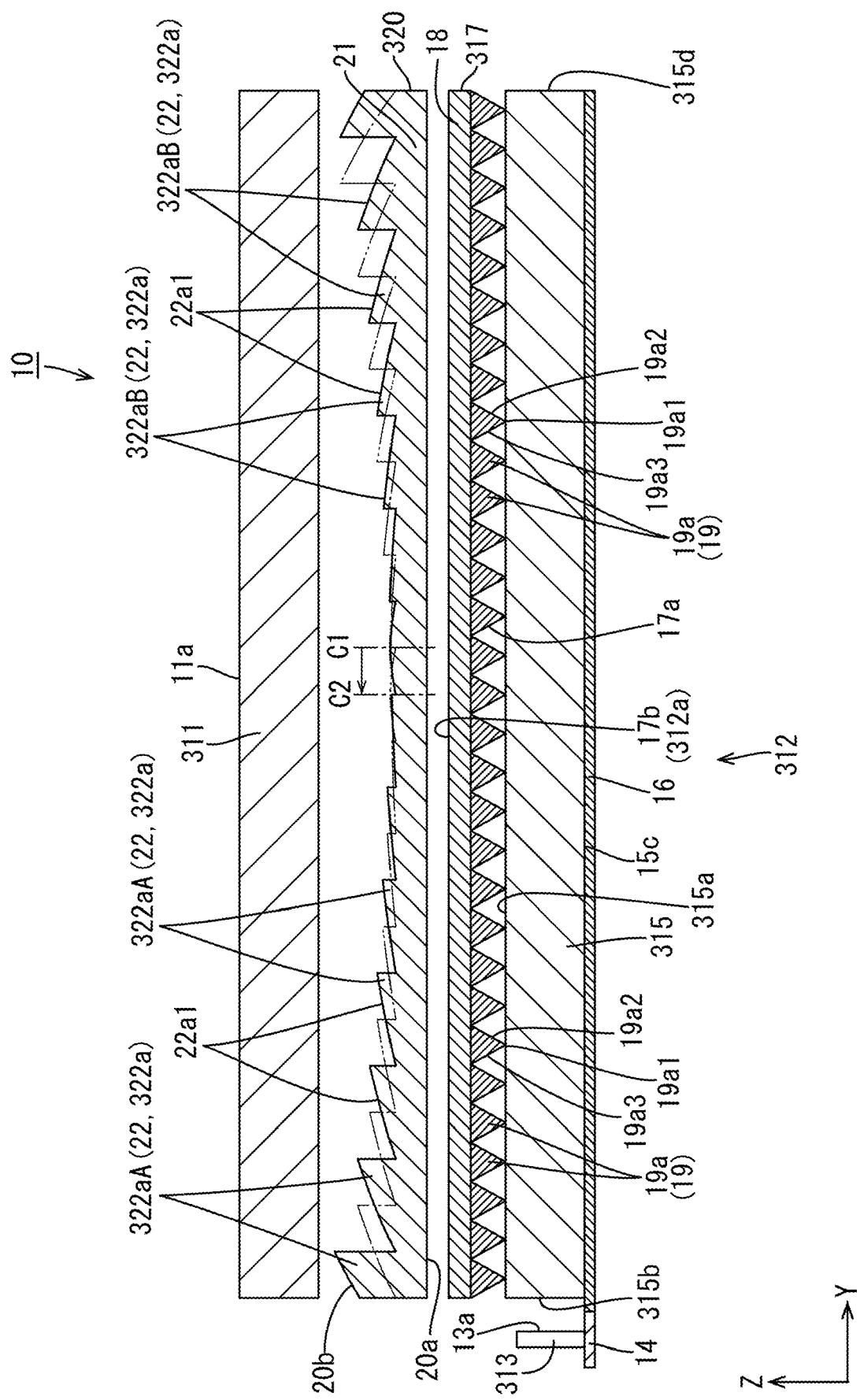
FIG. 12 is a cross-sectional view taken along a long side direction of the liquid crystal display device including the asymmetric linear Fresnel lens sheet in which the center position thereof is offset from that of the center directive prism sheet.
Figure 13:
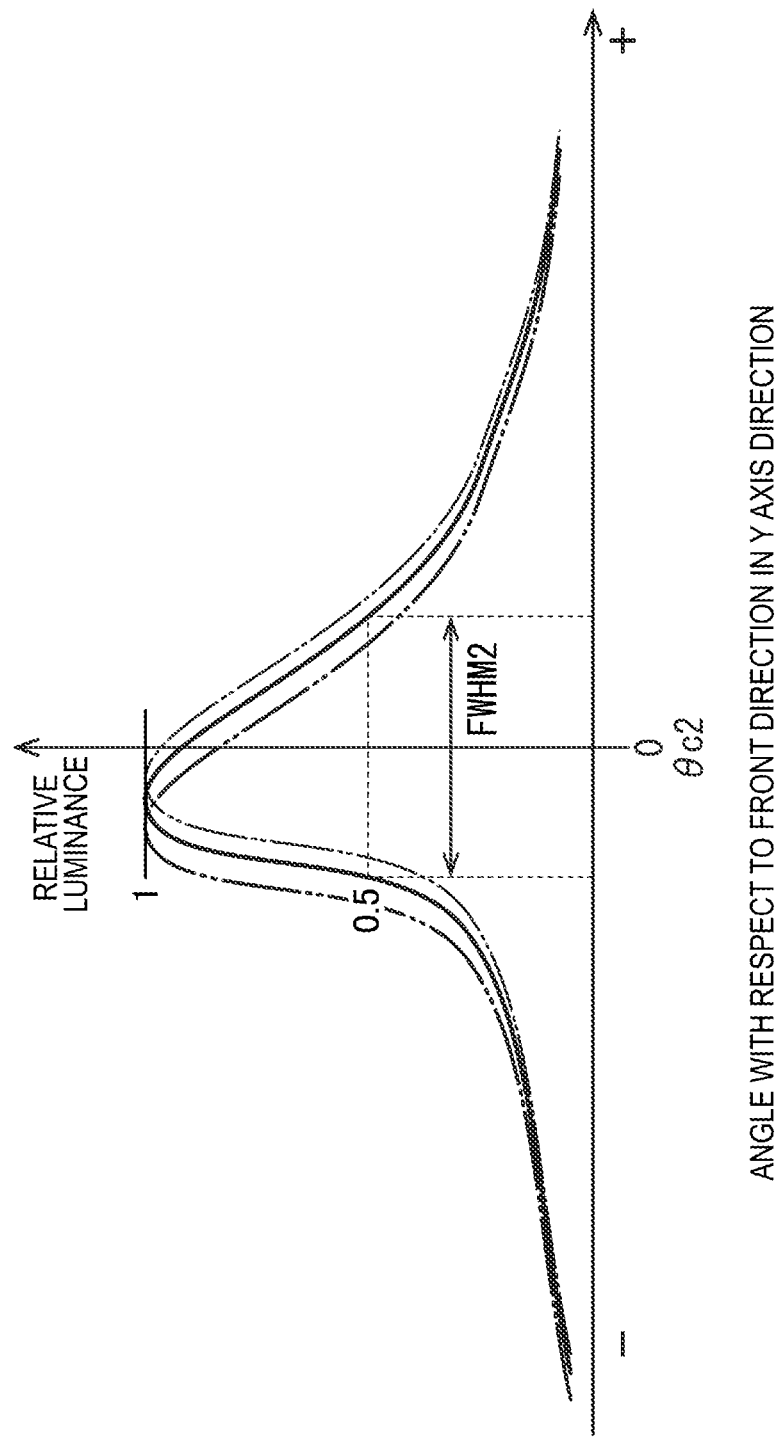
FIG. 13 is a graph illustrating a luminance angle distribution in the Y axis direction of the emission light of the asymmetric linear Fresnel lens sheet and the backlight device.

As shown in FIG. 11 and FIG. 12, in the asymmetric linear Fresnel lens sheet 320 according to the present embodiment, in a case in which a luminance angle distribution in the Y axis direction (first direction) according to emission light of a backlight device 312 is fluctuated, center positions C1 and C2 in the Y axis direction can be changed in accordance with the fluctuation. Specifically, the luminance angle distribution in the Y axis direction according to the emission light of the backlight device 312 may be fluctuated in accordance with an individual difference in producing of each component, specifically for example, a finishing state of a light emission plate surface 315a, a light incident end surface 315b or the like of a light guide plate 315. Specifically, the luminance angle distribution is shifted to a − (minus) side or a + (plus) side in the Y axis direction from a normal position. In the luminance angle distribution at the normal position, the optical performance of the backlight device 312 is derived as design. In the present embodiment, as shown in FIG. 13, a configuration in which the luminance angle distribution in the Y axis direction according to the emission light of the backlight device 312 is shifted to the − side in the Y axis direction from the normal position is exemplarily described. FIG. 13 is a graph illustrating the luminance angle distribution of the emission light of the asymmetric linear Fresnel lens sheet 320 and the backlight device 312, and a horizontal axis denotes an angle with respect to the front direction in the Y axis direction and a vertical axis denotes relative luminance of the emission light. In FIG. 13, the luminance angle distribution according to the emission light of the backlight device 312 at the normal position is shown by a thin two-dot chain line, the luminance angle distribution according to the emission light of the backlight device 312 shifted from the normal position is shown by a thick two-dot chain line, and the luminance angle distribution according to the emission light of the asymmetric linear Fresnel lens sheet 320 is shown by a solid line. In the angle in the horizontal axis in FIG. 13, the − (minus) side (a left side in FIG. 13) with respect to 0 degrees (front direction) serving as a reference corresponds to a side of an LED 313 (a side of a light incident end surface 315b) in the Y axis direction, and the + (plus) side (a right side in FIG. 13) with respect to 0 degrees corresponds to an opposite side (a side of a light incident opposite end surface 315d) opposite to the side of the LED 313 in the Y axis direction. The relative luminance in the vertical axis in FIG. 13 is a relative value as a maximum luminance value of the emission light is set to a reference (1.0).

As shown in FIG. 11 and FIG. 12, in a case in which the luminance angle distribution in the Y axis direction according to the emission light of the backlight device 312 is shifted to the − side in the Y axis direction from the normal position as described above, the center position C2 in the Y axis direction of the asymmetric linear Fresnel lens sheet 320 is set to be offset toward a side of the LED 313 (− side) in the Y axis direction, namely a side where the luminance angle distribution according to the emission light of the backlight device 312. At this time, in a curved surface lens 322a installed in the asymmetric linear Fresnel lens sheet 320, an occupancy ratio (a ratio of the number of occupancy or a ratio of a possessing area) of a small curvature curved surface lens 322aA becomes relatively large, and an occupancy ratio of a large curvature curved surface lens 322aB becomes relatively small. With this, since light quantity directed to a less light emission angle range from a much light emission angle range in the Y axis direction by the large curvature curved surface lens 322aB is decreased, as shown in FIG. 13, the luminance angle distribution according to the emission light of the asymmetric linear Fresnel lens sheet 320 coincides with the luminance angle distribution in the Y axis direction according to the emission light of the backlight device 312 shifted to the opposite side (+ side) opposite to the side of the LED 313 in the Y axis direction. The offset amount of the center position C2 described above is adjusted such that the center angle θc2 of the full width at half maximum FWHM2 of the luminance in the luminance angle distribution according to the emission light of the asymmetric linear Fresnel lens sheet 320 coincides with 0 degrees. With this, a positional deviation of the luminance angle distribution in the Y axis direction according to the emission light of the backlight device 312 can be corrected appropriately, and thereby the luminance unevenness can be further hardly generated. FIG. 11 shows the asymmetric linear Fresnel lens sheet 320 in which the center position C1 thereof coincides with a center position of the center directive prism sheet 317 of the backlight device 312. FIG. 12 shows the asymmetric linear Fresnel lens sheet 320 in which the center position C2 thereof is shifted from the center position of the center directive prism sheet 317 of the backlight device 312. In FIG. 12, the asymmetric linear Fresnel lens sheet 320 according to FIG. 11 is shown by a two-dot chain line, and the center positions C1 and C2 of each of the asymmetric linear Fresnel lens sheets 320 are shown by one-dot chain lines.

Figure 14:
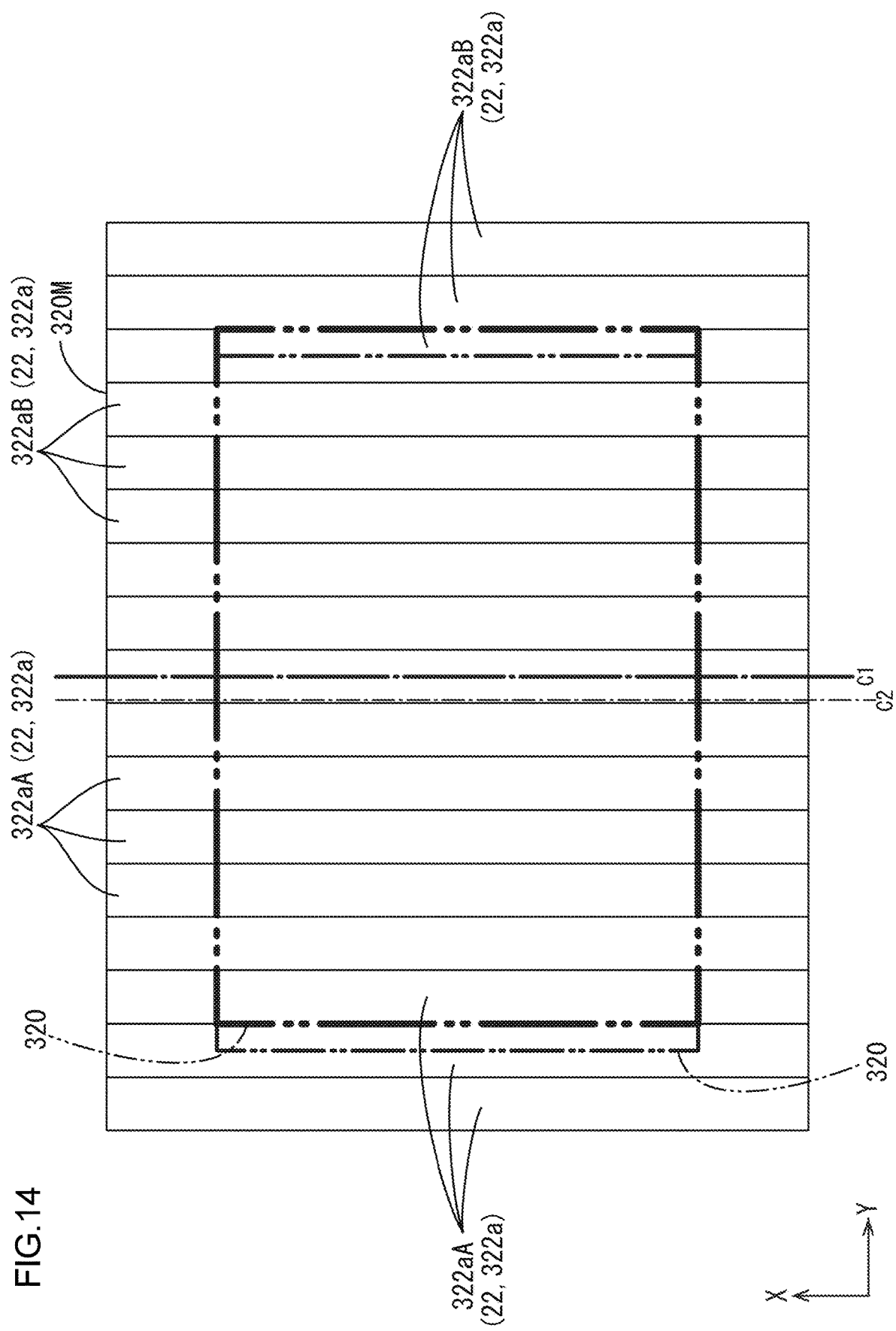
FIG. 14 is a plan view illustrating a parent material of the asymmetric linear Fresnel lens sheet.

Such operation for changing the center position in the Y axis direction of the asymmetric linear Fresnel lens sheet 320 can be performed, for example, in a producing step of the asymmetric linear Fresnel lens sheet 320. Specifically, the asymmetric linear Fresnel lens sheet 320 is produced by punching a parent material 320M shown in FIG. 14, and a punching position (cut position) in the Y axis direction at this time may be changed in accordance with the luminance angle distribution in the Y axis direction according to the emission light of the backlight device 312. In the present embodiment, the center position C2 in the Y axis direction of the asymmetric linear Fresnel lens sheet 320 is set to be offset from the normal position (the center position of the parent material 320M) to a left side (the side where the luminance angle distribution according to the emission light of the backlight device 312 is shifted) of FIG. 14. With this, as shown in FIG. 12, the asymmetric linear Fresnel lens sheet 320 in which the center position C2 in the Y axis direction is offset toward the side of the LED 313 (− side) in the Y axis direction can be obtained. In FIG. 14, a configuration in which the center position C1 in the Y axis direction of the asymmetric linear Fresnel lens sheet 320 coincides with the center position of the parent material 320M is shown by a thick two-dot chain line, and a configuration in which the center position C2 in the Y axis direction of the asymmetric linear Fresnel lens sheet 320 is offset from the center position of the parent material 320M is shown by a thin two-dot chain line.

In a case in which the luminance angle distribution in the Y axis direction according to the emission light of the backlight device 312 is shifted from the normal position to the + side in the Y axis direction, the center position C2 in the Y axis direction of the asymmetric linear Fresnel lens sheet 320 may be set to be offset toward the opposite side (+ side) opposite to the side of the LED 313 in the Y axis direction, namely the side where the luminance angle distribution according to the emission light of the backlight device 312 is shifted. In order to produce such an asymmetric linear Fresnel lens sheet 320, the center position C2 in the Y axis direction of the asymmetric linear Fresnel lens sheet 320 is set to be offset from the normal position (the center position of the parent material 320M) to the right side (the side where the luminance angle distribution according to the emission light of the backlight device 312 is shifted) of FIG. 14.

According to the present embodiment described above, the center position in the first direction of the asymmetric linear Fresnel lens sheet 320 is offset from the center position of the center directive prism sheet 317. Even in a case in which the luminance angle distribution indicating the luminance of the emission light at each angle with respect to the light emission surface 312a of the backlight device 312 is deviated in the first direction due to, for example, a problem in producing, since the center position in the first direction of the asymmetric linear Fresnel lens sheet 320 is offset from the center position in the first direction of the center directive prism sheet 317, the positional deviation of the luminance angle distribution can be corrected by adjusting the offset amount. With this, the luminance unevenness is further hardly generated.

Fifth Embodiment

A fifth embodiment of the present invention will be described with reference to FIG. 15. In the fifth embodiment, a configuration in which an asymmetric Fresnel lens sheet 26 is adopted instead of the asymmetric linear Fresnel lens sheet 20 described in the first embodiment is described. An overlapped description relating to a configuration, a function and an effect similar to those of the first embodiment, is omitted.

Figure 15:
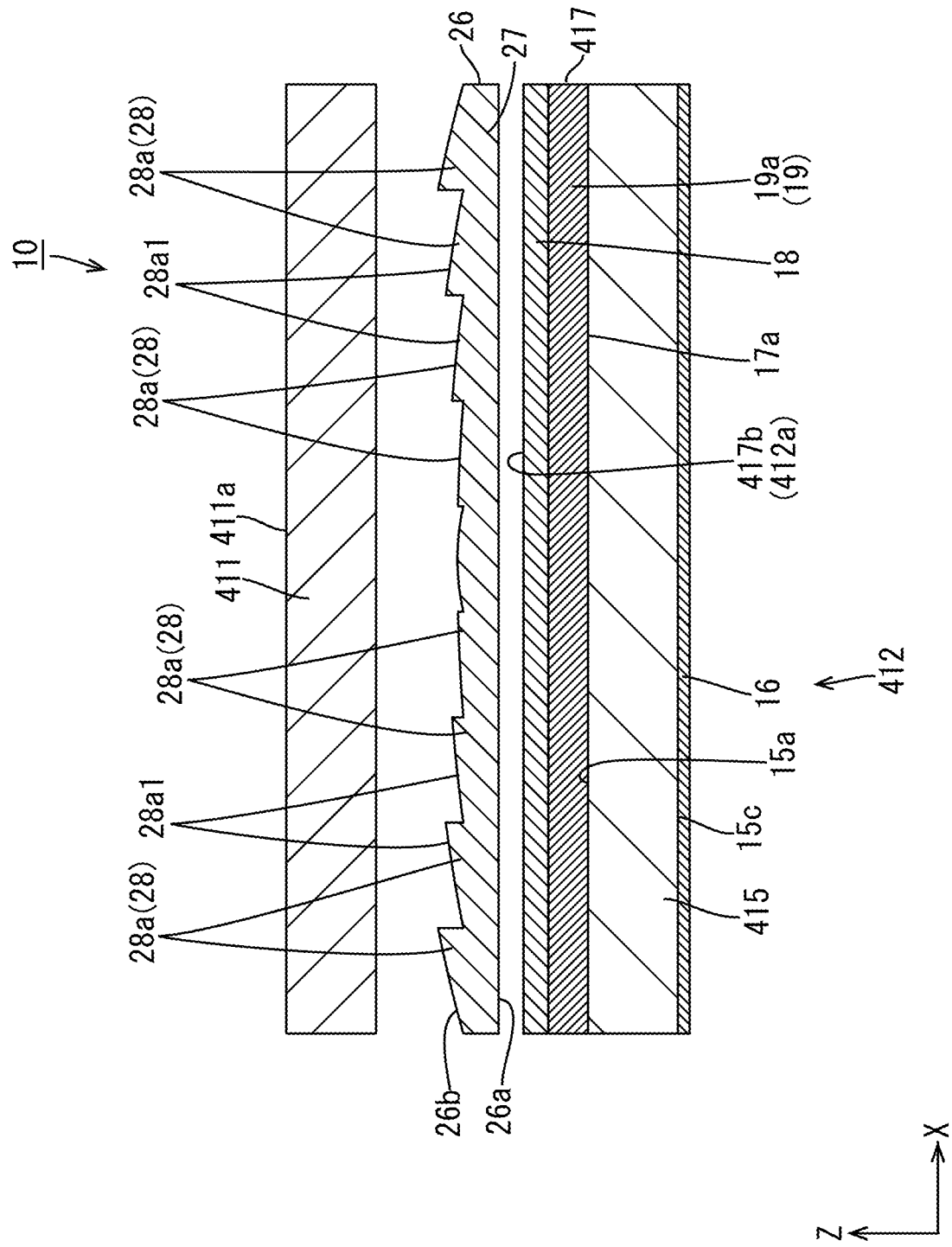
FIG. 15 is a cross-sectional view taken along a short side direction of a liquid crystal display device according to a fifth embodiment of the present invention.

As shown in FIG. 15, the asymmetric Fresnel lens sheet 26 according to the present embodiment is formed in a sheet shape having a sheet thickness thinner than a plate thickness of a light guide plate 415, and a plate surface of the asymmetric Fresnel lens sheet 26 is parallel to each of plate surfaces of a liquid crystal panel 411 and the light guide plate 415. The asymmetric Fresnel lens sheet 26 is formed such that, among a pair of front and back plate surfaces, a plate surface at a back side facing a plate surface (light emission surface 417b) of a center directive prism sheet 417 serves as a light incident surface 26a on which light from the center directive prism sheet 417 is incident, and a plate surface at a front side facing a plate surface (a plate surface at a side opposite to a display surface 411a) of the liquid crystal panel 411 serves as a light emission surface 26b from which the light is emitted toward the liquid crystal panel 411. A section of the asymmetric Fresnel lens sheet 26 taken along the Y axis direction (first direction) is the same as the section of the asymmetric linear Fresnel lens sheet 20 shown in FIG. 4 described in the first embodiment, and thereby an illustration thereof is omitted.

More specifically, as shown in FIG. 15, the asymmetric Fresnel lens sheet 26 is formed by a base material 27 formed of a substantially transparent synthetic resin, and an asymmetric Fresnel lens portion (asymmetric light refraction portion) 28 arranged on a plate surface of the base material 27 at a front side, namely arranged on the light emission surface 26b, so as to impart a light condensing effect to the emission light. The asymmetric Fresnel lens portion 28 is formed by curved surface lenses (unit asymmetric light refraction portion) 28a, each of which is protruded from the light emission surface 26b toward the front side (a light emission side, a side of the liquid crystal panel 411) along the Z axis direction. In the asymmetric Fresnel lens portion 28, a section taken along the X axis direction (second direction) and the Y axis direction is formed in a substantially serrated shape by arranging the curved surface lenses 28a in a stepped manner. That is, the curved surface lenses 28a are arranged concentrically. The curved surface lens 28a is formed in a substantially arc shape in section taken along the X axis direction and the Y axis direction and the surface thereof is formed as a curved surface 28a1 having an arc shape. That is, the curved surface lens 28a is formed as a so-called "Fresnel lens" having a curvature in each of the X axis direction and the Y axis direction. Similar to the curved surface lenses 22a of the asymmetric linear Fresnel lens sheet 20 according to the first embodiment described above, among the curved surface lenses 28a, a curvature of the curved surface 28a1 of the curved surface lens 28a located at a side opposite to a side of the LED 13 in the Y axis direction is larger than a curvature of the curved surface 28a1 of the curved surface lens 28a located at the side of the LED 13 in the Y axis direction (see FIG. 4). According to the asymmetric Fresnel lens sheet 26 having such a configuration, an asymmetric refraction effect can be imparted to the emission light from a light emission surface 412a of a backlight device 412 in the Y axis direction similar to the first embodiment described above, and a symmetric refraction effect can be imparted to the light in the X axis direction similar to the third embodiment described above.

Sixth Embodiment

A sixth embodiment of the present invention will be described with reference to FIG. 16. In the sixth embodiment, a configuration in which a curved surface lens 31a of an asymmetric linear Fresnel lens sheet 29 is modified from that of the first embodiment is described. An overlapped description relating to a configuration, a function and an effect similar to those of the first embodiment, is omitted.

As shown in FIG. 16, in the asymmetric linear Fresnel lens sheet (asymmetric light refraction member) 29 according to the present embodiment, a curvature of a curved surface of a curved surface lens 31a is set to be uniform. Specifically, the asymmetric linear Fresnel lens sheet 29 has a light incident surface 29a and a light emission surface 29b similar to the asymmetric linear Fresnel lens sheet 20 (see FIG. 4) described in the first embodiment. The asymmetric linear Fresnel lens sheet 29 is formed by a base material 30 formed of a substantially transparent synthetic resin, and an asymmetric linear Fresnel lens portion (asymmetric light refraction portion) 31 arranged on a plate surface of the base material 30 at a front side, namely arranged on the light emission surface 29b, so as to impart a light condensing effect to the emission light. The asymmetric linear Fresnel lens portion 31 is formed by curved surface lenses (unit asymmetric light refraction portion) 31a, each of which is protruded from the light emission surface 29b toward the front side along the Z axis direction, similar to that described in the first embodiment. In the asymmetric linear Fresnel lens portion 31, a section taken along the X axis direction (second direction) is formed in a flat shape, while a section taken along the Y axis direction (first direction) is formed in a substantially serrated shape by arranging the curved surface lenses 31a in a stepped manner. The curved surface lens 31a is formed in a substantially arc shape in section taken along the Y axis direction and the surface thereof is formed as a curved surface 31a1 having an arc shape. The curved surface lens 31a is formed as a so-called "linear Fresnel lens" having a curvature in the Y axis direction and not having a curvature in the X axis direction.

As shown in FIG. 16, in the asymmetric linear Fresnel lens sheet 29, a center position C4 in the Y axis direction is set to be offset toward an opposite side (+ side) opposite to a side of an LED 513 in the Y axis direction, namely a side of a much light emission angle range in a luminance angle distribution according to the emission light of a center directive prism sheet 517, from a center position C3 in the Y axis direction of a liquid crystal panel 511 and a backlight device 512 (center directive prism sheet 517). With such a configuration, among the curved surface lenses 31a, at least a part of the curved surface lens 31a arranged at the side of the LED 513 (a side of a less light emission angle range) in the Y axis direction with respect to the center position C4 is arranged at the side of the much light emission angle range (the opposite side opposite to the side of the LED 513 with respect to the center position C3) in the luminance angle distribution according to the emission light of the center directive prism sheet 517. Accordingly, a refraction effect is imparted to at least a part of the light in the much light emission angle range among the emission light of the center directive prism sheet 517 by at least a part of the curved surface lens 31a arranged at the side of the LED 513 in the Y axis direction with respect to the center position C4, so that the light is directed to the side of the less light emission angle range. On the other hand, the refraction effect is imparted to the light in the less light emission angle range among the emission light of the center directive prism sheet 517 by the curved surface lens 31a arranged at the side of the LED 513 in the Y axis direction with respect to the center position C4, so that the light is directed to the side of the less light emission angle range. In this way, the asymmetric refraction effect is imparted to the light, and thereby the luminance unevenness is hardly generated. The offset amount of the center position C4 described above is adjusted, similar to those in the first and fourth embodiments, such that the center angle $\theta c2$ of the full width at half maximum FWHM2 of the luminance in the luminance angle distribution according to the emission light of the asymmetric linear Fresnel lens sheet 29 coincides with 0 degrees (see FIG. 7 and FIG. 13). In FIG. 16, each of the center position C3 of the liquid crystal panel 511 and the backlight device 512, and the center position C4 of the asymmetric linear Fresnel lens sheet 29 are shown by a one-dot chain line.

As described above, according to the present embodiment, the center directive prism sheet 517 selectively imparts the refraction effect to the light in the first direction along a light emission surface 512a, and the asymmetric linear Fresnel lens sheet (asymmetric light refraction member) 29 has the base material 30, and the curved surface lens 31a arranged on the light emission surface 29b of the base material 30 from which the light is emitted, of the base material 30, wherein the curved surface lens has a surface formed in a curved shape having a uniform curvature, and the center position thereof in the first direction is offset toward the side of the much light emission angle range in the first direction from the center position of the center directive prism sheet 517. With such a configuration, when the light is emitted from the LED 513, the refraction effect is selectively imparted to the light in the first direction along the light emission surface 512a of the backlight device 512, by the center directive prism sheet 517, and thereby the utilization efficiency of the light in the first direction is improved and the front luminance of the liquid crystal panel 511 is improved. On the other hand, in the asymmetric linear Fresnel lens sheet 29, a surface of the curved surface lens 31a, which is arranged on the light emission surface 29b of the base material 30, is formed in a curved shape having a uniform curvature, and thereby the asymmetric linear Fresnel lens sheet 29 imparts the refraction effect to the emission light of the center directive prism sheet 517. Since the center position in the first direction of the asymmetric linear Fresnel lens sheet 29 is offset toward the side of the much light emission angle range from the center position in the first direction of the center directive prism sheet 517, at least a part of the curved surface lens 31a arranged at the side of the less light emission angle range in the first direction with respect to the center position in the first direction of the asymmetric linear Fresnel lens sheet 29 is arranged at the side of the much light emission angle range. Accordingly, the refraction effect is imparted to at least a part of the light in the much light emission angle range among the emission light of the center directive prism sheet 517 by the at least a part of the curved surface lens 31a arranged at the side of the less light emission angle range in the first direction with respect to the center position in the first direction of the asymmetric linear Fresnel lens sheet 29, and thereby the light is directed to the side of the less light emission angle range. On the other hand, the refraction effect is imparted to the light in the less light emission angle range among the emission light of the center directive prism sheet 517 by the curved surface lens 31a arranged at the side of the less light emission angle range in the first direction with respect to the center position in the first direction of the asymmetric linear Fresnel lens sheet 29, and thereby the light is directed to the less light emission angle range. In this way, the asymmetric refraction effect is imparted to the light, and thereby the luminance unevenness is hardly generated.

Other Embodiments

The present invention is not limited to the embodiments described by the description and the drawings described above, and therefore, for example, the following embodiments are also encompassed in the subject matter of the present invention.

(1) In each embodiment described above, the configuration in which the center angle of the full width at half maximum of the luminance in the luminance angle distribution according to the emission light of each of the asymmetric linear Fresnel lens sheet and the asymmetric Fresnel lens sheet is set to 0 degrees is exemplarily described. However, a configuration in which the center angle of the full width at half maximum of the luminance in the luminance angle distribution according to the emission light of each of the asymmetric linear Fresnel lens sheet and the asymmetric Fresnel lens sheet is shifted to the + side or the − side from 0 degrees may be adopted.

(2) In each embodiment described above, the configuration in which the center directive prism sheet having the light condensing portion formed of the prisms is adopted as "the center directive light refraction member" is exemplarily described; however a center directive linear Fresnel lens sheet having a linear Fresnel lens portion, a center directive Fresnel lens sheet having a Fresnel lens portion or the like may be adopted as "the center directive light refraction member" other than the center directive prism sheet.

(3) Other than (2) described above, for example, a light guide plate having a light emission plate surface on which a light condensing portion formed of prisms is integrally arranged may be adopted as "the center directive light refraction member". In such a case, instead of the light condensing portion formed of the prisms, a linear Fresnel lens portion or a Fresnel lens portion may be integrally arranged on the light emission plate surface of the light guide plate.

(4) In the third embodiment described above, the configuration in which the symmetric linear Fresnel lens sheet is arranged to be interposed between the asymmetric linear Fresnel lens sheet and the backlight device is exemplarily described; however a configuration in which the symmetric linear Fresnel lens sheet is arranged to be interposed between the asymmetric linear Fresnel lens sheet and the liquid crystal panel may be adopted. Further, a configuration in which the symmetric linear Fresnel lens sheet is arranged to be overlapped with the liquid crystal panel at a light emission side may be adopted.

(5) In the third embodiment described above, the configuration in which the symmetric linear Fresnel lens sheet is added in addition to the asymmetric linear Fresnel lens sheet is described; however a linear Fresnel lens portion may be integrally arranged on the light emission plate surface of the light guide plate, instead of the symmetric linear Fresnel lens sheet.

(6) In each embodiment described above, the configuration in which the backlight device has only the center directive prism sheet as an optical sheet laminated on the light guide plate at the light emission side is exemplarily described; however another optical sheet may be imparted to be overlapped with the center directive prism sheet. Examples of the additional optical sheet include a diffusion sheet, a prism sheet, a reflective polarizing sheet and the like. Of these optical sheets, the prism sheet is formed to have a configuration in which a light condensing portion formed of prisms is arranged at a light emission surface, namely a configuration in which a front side and a back side of the center directive prism sheet are inverted. The number of the additional optical sheets may be one or more, and a specific lamination order may be appropriately adopted.

(7) The configuration (the configuration in which the asymmetric linear Fresnel lens sheet is arranged at the light emission side of the liquid crystal panel) described in the second embodiment may be combined to each of the configurations described in the third to sixth embodiments.

(8) The configuration (the configuration in which the symmetric linear Fresnel lens sheet is added) described in the third embodiment may be combined to each of the configurations described in the fourth to sixth embodiments.

(9) The configuration (the configuration in which the center position of the asymmetric linear Fresnel lens sheet is offset) described in the fourth embodiment may be combined to each of the configurations described in the fifth and sixth embodiments.

(10) The configuration (the configuration in which the asymmetric Fresnel lens sheet is adopted) described in the fifth embodiment may be combined to the configuration described in the sixth embodiment.

(11) In each embodiment described above, the LED, which is a point light source, is exemplarily described as a light source; however a linear light source may be adopted as the light source instead of the point light source.

(12) In each embodiment described above, the one-sided light incident type backlight device in which the light is incident on the light guide plate from one side is described; however a both-sided light incident type backlight device in which the light is incident on the light guide plate from both sides may be adopted.

(13) Other than each embodiment described above, the number of the LEDs mounted on the LED substrate can be changed as needed. Further, the number of the arranged LED substrates can be changed as needed.

(14) In the drawing of each of the embodiments described above, the size of each of the prisms, the curved surface lenses or the like or the number of those components is described in a deformed manner, and therefore the actual size or the number thereof may be different from that illustrated in the drawings.

(15) In each embodiment described above, the configuration in which the LED substrate on which the side surface light emission type LED is mounted is arranged to be overlapped with the light guide plate at the back side thereof is described; however the LED substrate on which the side surface light emission type LED is mounted may be arranged to be overlapped with the light guide plate at the front side thereof. Further, a top surface light emission type LED may be adopted as a light source instead of the side surface light emission type LED. In such a case, the LED substrate is arranged such that a surface on which the LED is mounted is parallel to the light incident end surface of the light guide plate.

(16) In each embodiment described above, the LED is adopted as a light source; however a laser diode, an organic EL or the like may be adopted as the light source instead of the LED.

(17) In each embodiment described above, the liquid crystal display device having the liquid crystal panel is exemplarily described; however the present invention can be applied to a display device having another kind of a display panel such as a PDP (plasma display panel), an organic EL panel, an EPD (electrophoretic display panel), a MEMS (Micro Electro Mechanical Systems) display panel and the like.

(18) In each embodiment described above, the head-mounted display is described; however the present invention can be applied to a device that enlarges and displays an image displayed on a liquid crystal panel by using a lens, such as a head up display and a projector. Further, the present invention can be applied to a liquid crystal display device (a television receiving device, a tablet type terminal, a smartphone or the like) not having an enlarging display function.

EXPLANATION OF SYMBOLS

10: Liquid crystal display device (Display device)
11, 111, 211, 311, 411, 511: Liquid crystal panel (Display panel)
12, 112, 212, 312, 412, 512: Backlight device (Lighting device)
12a, 212a, 312a, 412a, 512a: Light emission surface
13, 213, 313, 513: LED (Light source)
15, 215, 315, 415: Light guide plate
15a, 315a: Light emission plate surface
15b, 215b, 315b: Light incident end surface
17, 117, 217, 317, 417, 517: Center directive prism sheet (Center directive light refraction member)
17a: Light incident surface
19a: Prism
19a1: Apex part
19a2: LED opposite side inclined surface (Inclined surface)
19a3: LED side inclined surface (Inclined surface)
20, 120, 220, 320: Asymmetric linear Fresnel lens sheet (Asymmetric light refraction member)
20b: Light emission surface
21: Base material
22a, 222a, 322a: Curved surface lens
22a1: Curved surface (Surface)
23: Symmetric linear Fresnel lens sheet (Symmetric light refraction member)
26: Asymmetric Fresnel lens sheet (Asymmetric light refraction member)
26b: Light emission surface
27: Base material
28a: Curved surface lens
28a1: Curved surface (Surface)
29: Asymmetric linear Fresnel lens sheet (Asymmetric light refraction member)
29b: Light emission surface
30: Base material
31a: Curved surface lens
31a1: Curved surface (Surface)
FWHM1, FWHM2: Full width at half maximum
θc1, θc2: Center angle
EY: Eye ball (Eye)
EYa: Crystalline lens (Eye)
EYb: Retina (Eye)
HD: Head
HMD: Head-mounted display
HMDa: Head-mounted instrument
RE: Lens portion

The invention claimed is:
1. A display device comprising:
a display panel;
a lighting device having a light emission surface through which light exits toward the display panel;
a light source included in the lighting device;
a center directive light refraction member included in the lighting device to face the display panel and configured to impart a refraction effect to at least light exiting through the light emission surface to be directed to a middle section of the display panel, so that a much light emission angle range in which an emission light quantity is relatively much and a less light emission angle range in which the emission light quantity is relatively less are generated in a luminance angle distribution indicating luminance of emission light at each angle with respect to the light emission surface; and
an asymmetric light refraction member arranged to be overlapped with the display panel on a lighting device side or an opposite side from the lighting device side and configured to impart an asymmetric refraction effect to the emission light such that light rays in the less light emission angle range among emission light exiting the center directive light refraction member is directed toward the less light emission angle range, while at least a part of light rays in the much light emission angle range among the emission light exiting the center directive light refraction member is directed toward the less light emission angle range.

2. The display device according to claim 1, wherein the asymmetric light refraction member is configured to impart an asymmetric refraction effect to emission light exiting the center directive light refraction member such that a center angle of a full width at half maximum of luminance in a luminance angle distribution indicating luminance of the emission light at each angle with respect to the light emission surface of the asymmetric light refraction member becomes close to 0 degrees.

3. The display device according to claim 1, wherein
the lighting device includes a light guide plate formed in a plate shape having a light incident end surface on which light is incident and a light emission plate surface through which the light exits, the light incident end surface is one of outer peripheral end surfaces arranged to face the light source and the light emission plate surface is one of plate surfaces, and
the center directive light refraction member has a light incident surface facing the light emission plate surface of the light guide plate and has a plurality of prisms aligned along a normal direction of the light incident end surface, and each of the prisms is arranged on the light incident surface to be extended along an orthogonal direction orthogonal to the normal direction of the light incident end surface and each of the prisms has an apex part and a pair of inclined surfaces interposing the apex part.

4. The display device according to claim 1, wherein the asymmetric light refraction member is arranged to be overlapped with the display panel on the lighting device side.

5. The display device according to claim 1, wherein the asymmetric light refraction member is arranged to be overlapped with the display panel on an opposite side of the lighting device.

6. The display device according to claim 1, wherein
the center directive light refraction member is configured to selectively impart the refraction effect to light in a first direction along the light emission surface; and
the display device further comprises a symmetric light refraction member arranged to be overlapped with the asymmetric light refraction member on the lighting device side or an opposite side from the lighting device side to impart a symmetric refraction effect to emission light exiting the center directive light refraction member in a second direction orthogonal to the first direction.

7. The display device according to claim 1, wherein
the center directive light refraction member is configured to selectively impart the refraction effect to light in a first direction along the light emission surface;
the asymmetric light refraction member has a base material and a curved surface lens arranged on a light emission surface of the base material, light exits through the light emission surface, and the curved surface lens has a surface formed in a curved shape, and
the curved surface lens is formed such that a curvature of the surface in the much light emission angle range in the first direction is larger than a curvature of the surface in the less light emission angle range in the first direction.

8. The display device according to claim 1, wherein
the center directive light refraction member is configured to selectively impart the refraction effect to light with respect to a first direction along the light emission surface;
the asymmetric light refraction member has a base material and a curved surface lens arranged on a light emission surface of the base material, light exits through the light emission surface, and the curved surface lens has a surface formed in a curved shape having a uniform curvature, and the asymmetric light refraction member is arranged such that a center position in the first direction is offset from a center position of the center directive light refraction member toward the much light emission angle range in the first direction.

9. A head-mounted display at least comprising:
the display device according to claim 1;
a lens portion that images an image displayed on the display device, in an eye of a user; and
a head-mounted instrument having the display device and the lens portion to be mounted to a head of the user.

10. The display device according to claim 7, wherein
the asymmetric light refraction member serves as a linear Fresnel lens in which the curved surface lens is extended linearly in a second direction orthogonal to the first direction and a plurality of the curved surface lenses is aligned along the first direction, and
a plurality of the linear Fresnel lenses is set such that a curvature of a surface of the linear Fresnel lens arranged on a much light emission angle range side with respect to the first direction is larger than a curvature of a surface of the linear Fresnel lens arranged on a less light emission angle range side.

11. The display device according to claim 7, wherein the asymmetric light refraction member is arranged such that a center position with respect to the first direction is offset from a center position of the center directive light refraction member.

* * * * *